United States Patent
Su et al.

(10) Patent No.: US 12,520,332 B2
(45) Date of Patent: Jan. 6, 2026

(54) COMMUNICATION METHOD AND APPARATUS

(71) Applicant: Huawei Technologies Co., Ltd., Shenzhen (CN)

(72) Inventors: Hongjia Su, Shanghai (CN); Lei Dong, Shanghai (CN); Wenting Guo, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 350 days.

(21) Appl. No.: 18/344,016

(22) Filed: Jun. 29, 2023

(65) Prior Publication Data

US 2023/0345511 A1 Oct. 26, 2023

Related U.S. Application Data

(63) Continuation of application No. PCT/CN2020/142523, filed on Dec. 31, 2020.

(51) Int. Cl.
*H04W 72/40* (2023.01)
*H04W 72/044* (2023.01)

(52) U.S. Cl.
CPC ......... *H04W 72/40* (2023.01); *H04W 72/044* (2013.01)

(58) Field of Classification Search
CPC ........... H04W 72/044; H04W 72/0446; H04W 72/40; H04W 92/18
See application file for complete search history.

(56) References Cited

U.S. PATENT DOCUMENTS 10,993,263 B2 * 4/2021 Lee ..................... H04W 72/121
2020/0267523 A1 8/2020 Tang et al.
(Continued)

FOREIGN PATENT DOCUMENTS

| CN | 112135350 A | 12/2020 |
| WO | 2020198760 A2 | 10/2020 |
| WO | 2020264539 A1 | 12/2020 |

OTHER PUBLICATIONS

Fraunhofer Hhi, et al., "Resource Allocation Enhancements", 3GPP TSG RAN WG2 Meeting #112-e R2-2009992, Nov. 30, 2020, 6 pages.

(Continued)

*Primary Examiner* — Awet Haile
(74) *Attorney, Agent, or Firm* — Slater Matsil, LLP

(57) ABSTRACT

In accordance with an embodiment, a method includes: obtaining, at least one first time window in a time-frequency resource set, wherein the time-frequency resource set is used by a terminal to send sidelink communication information; obtaining first control information from a second terminal, wherein the first control information comprises activation indication information; activating one of the at least one first time window based on the first control information to establish an active first time window; stopping a determining by sensing the time-frequency resource set, a time-frequency resource for sending the sidelink communication information in the active first time window; receiving first indication information from the second terminal in the active first time window, wherein the first indication information indicates at least one time-frequency resource; and sending first sidelink communication information on the at least one time-frequency resource.

20 Claims, 14 Drawing Sheets

(56) References Cited

U.S. PATENT DOCUMENTS

| | | | | |
|---|---|---|---|---|
| 2023/0164751 A1* | 5/2023 | Wang | ............ | H04W 52/028 |
| | | | | 370/329 |
| 2023/0171799 A1* | 6/2023 | Guo | ............ | H04W 72/54 |
| | | | | 370/329 |
| 2023/0199837 A1* | 6/2023 | Peng | ............ | H04L 5/0053 |
| | | | | 370/329 |
| 2023/0276526 A1* | 8/2023 | Shin | ............ | H04W 76/23 |
| | | | | 370/329 |
| 2023/0284136 A1* | 9/2023 | Ganesan | ............ | H04W 76/28 |
| | | | | 370/311 |
| 2023/0345530 A1* | 10/2023 | Wu | ............ | H04L 1/1812 |
| 2023/0389121 A1* | 11/2023 | Ko | ............ | H04W 40/22 |
| 2024/0049194 A1* | 2/2024 | Zhao | ............ | H04W 72/25 |

OTHER PUBLICATIONS

LG Electronics, "Discussion on feasibility and benefits for mode 2 enhancement", 3GPP TSG RAN WG1 Meeting #103-e R1-2007896, Nov. 13, 2020, 23 pages.

LG Electronics: "Discussion on feasibility and benefits for mode 2 enhancement", 3GPP Draft; R1-2005749, Aug. 8, 2020, XP051917712, total 9 pages.

\* cited by examiner

COMMUNICATION METHOD AND APPARATUS

CROSS-REFERENCE TO RELATED APPLICATIONS

This application is a continuation of International Application No. PCT/CN2020/142523, filed on Dec. 31, 2020, the disclosure of which is hereby incorporated by reference in its entirety.

TECHNICAL FIELD

This application relates to the field of sidelink communication, and in particular, to a communication method and apparatus.

BACKGROUND

In a long term evolution (LTE) technology network proposed in the 3rd generation partnership project (3GPP), a vehicle-to-everything (V2X) internet of vehicles technology is proposed. V2X communication is communication between a vehicle and everything. Refer to FIG. 1. The V2X communication includes vehicle to vehicle (V2V) communication, vehicle to pedestrian (V2P) communication, vehicle to infrastructure (V2I) communication, vehicle to network (V2N) communication, and the like. Based on the V2X technology, a vehicle user may send information such as a position, a speed, and an intention (turning, merging, and reversing) of the vehicle user to a surrounding vehicle user, or may receive information about the surrounding vehicle user in real time.

A manner of direct communication between vehicles is referred to as sidelink communication. A sidelink communication resource allocation manner includes a scheduling mode and an autonomous resource selection mode. In autonomous resource selection mode, user equipment (UE) determines a transmission resource for sending and receiving sidelink communication information. For example, the UE determines, by sensing a time-frequency resource set, a time-frequency resource for sending the sidelink communication information. At a given moment, UE reserves a time-frequency resource that is after the moment, to perform data transmission or retransmission. Other UE learns of a time-frequency resource reservation status of the user by sensing the time-frequency resource set, thereby avoiding selecting the reserved time-frequency resource, to reduce a resource collision.

In some cases, the UE cannot sense the time-frequency resource set, or cannot obtain all of the time-frequency resource set through sensing. For example, sensing is not performed at a moment at which the UE sends the sidelink communication information. For another example, to save energy and reduce a quantity of times of sensing performed by the UE, sensing is not performed in a specified time period. For another example, the UE does not perform sensing at all, and selects, in a random selection manner, the time-frequency resource for sending the sidelink communication information. Therefore, the UE cannot obtain a complete sensing result. Consequently, a probability of a collision or a conflict between selected time-frequency resources is increased, and reliability of sidelink communication transmission is reduced.

SUMMARY

This application provides a communication method and apparatus, to reduce a probability of a conflict between time-frequency resources for sending sidelink communication information.

To achieve the foregoing objective, the following technical solutions are used in embodiments of this application.

According to a first aspect, an embodiment of this application provides a communication method. The method may be performed by a terminal device, or may be performed by a component of the terminal device, for example, a processor, a chip, or a chip system of the terminal device. The method includes: A first terminal obtains at least one first time window in a time-frequency resource set, where the time-frequency resource set is used by a terminal to send sidelink communication information. The first terminal obtains first control information from a second terminal, where the first control information includes activation indication information. The first terminal activates one of the at least one first time window based on the first control information. The first terminal stops determining, by sensing the time-frequency resource set, a time-frequency resource for sending the sidelink communication information in the active first time window. The first terminal receives first indication information from the second terminal in the active first time window, where the first indication information indicates at least one time-frequency resource. The first terminal sends first sidelink communication information on the at least one time-frequency resource.

In the method, the second terminal determines that one of the at least one first time window is to be activated. In the active first time window, the first terminal selects, based on an indication of the second terminal, the time-frequency resource for sending the SL information in the active first time window, instead of determining, by sensing the time-frequency resource set, the time-frequency resource for sending the SL information in the active first time window. In this way, energy consumption of sensing can be reduced, and a probability of a conflict between resources for sending the SL information is also reduced.

With reference to the first aspect, in a possible implementation, the first control information includes deactivation indication information, and the method further includes: The first terminal deactivates one of the at least one first time window based on the first control information. The first terminal determines, by sensing the time-frequency resource set, a time-frequency resource for sending the sidelink communication information in the deactivated first time window. In other words, when the second terminal determines that the first time window is not to be activated, the first terminal determines, by sensing the time-frequency resource set, the time-frequency resource for sending the sidelink communication information.

With reference to the first aspect, in a possible implementation, the method further includes: The first terminal receives second control information from the second terminal, where the second control information indicates to prolong duration of the first time window.

In this way, the second terminal does not need to reconfigure a first time window for the first terminal, and the first terminal only needs to prolong the current first time window by a period of time based on a configuration of the current first time window. A procedure of configuring the first time window is faster and more convenient, and resource configuration efficiency is improved.

With reference to the first aspect, in a possible implementation, the first control information is carried on a physical channel.

With reference to the first aspect, in a possible implementation, the second control information is carried on a physical channel.

In an implementation, the physical channel is a physical sidelink feedback channel.

With reference to the first aspect, in a possible implementation, the active first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

With reference to the first aspect, in a possible implementation, before the first terminal receives the first indication information from the second terminal in the active first time window, the first terminal sends auxiliary information in the active first time window, where the auxiliary information is for triggering the second terminal to determine the time-frequency resource used by the first terminal to send the first SL information. The auxiliary information includes at least one of the following: priority information of the to-be-sent first sidelink communication information, size information of the to-be-sent first sidelink communication information, identification information of the first terminal, and identification information corresponding to a receiving end to which the first terminal is to send the first SL information.

According to a second aspect, an embodiment of this application provides a communication method. The method may be performed by a terminal device, or may be performed by a component of the terminal device, for example, a processor, a chip, or a chip system of the terminal device. The method includes: A second terminal obtains at least one first time window in a time-frequency resource set, where the time-frequency resource set is used by a terminal to send sidelink communication information. The second terminal sends first control information to a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information. The second terminal sends first indication information to the first terminal in the active first time window, where the first indication information indicates at least one time-frequency resource, and is used by the first terminal to send first sidelink communication information on the at least one time-frequency resource.

In the method, the second terminal determines that one of the at least one first time window is to be activated. In the active first time window, the first terminal selects, based on an indication of the second terminal, the time-frequency resource for sending the SL information in the active first time window, instead of determining, by sensing the time-frequency resource set, the time-frequency resource for sending the SL information in the active first time window. In this way, energy consumption of sensing can be reduced, and a probability of a conflict between resources for sending the SL information is also reduced.

With reference to the second aspect, in a possible implementation, the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

With reference to the second aspect, in a possible implementation, the second terminal sends second control information to the first terminal, where the second control information indicates to prolong duration of the first time window.

In this way, the second terminal does not need to reconfigure a first time window for the first terminal, and the first terminal only needs to prolong the current first time window by a period of time based on a configuration of the current first time window. A procedure of configuring the first time window is faster and more convenient, and resource configuration efficiency is improved.

With reference to the second aspect, in a possible implementation, the first control information is carried on a physical channel.

With reference to the second aspect, in a possible implementation, the second control information is carried on a physical channel.

In an implementation, the physical channel is a physical sidelink feedback channel.

With reference to the second aspect, in a possible implementation, the active first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

With reference to the second aspect, in a possible implementation, the second terminal determines, by sensing the time-frequency resource set, the time-frequency resource used by the first terminal to send the first sidelink communication information in the active first time window. In a possible implementation, the second terminal determines, through scheduling or resource configuration of a network device, the time-frequency resource used by the first terminal to send the first sidelink communication information in the active first time window.

According to a third aspect, an embodiment of this application provides a communication method. The method may be performed by a terminal device, or may be performed by a component of the terminal device, for example, a processor, a chip, or a chip system of the terminal device. The method includes: A first terminal obtains at least one first time window in a time-frequency resource set, where the time-frequency resource set is used by a terminal to send sidelink communication information. The first terminal sends first control information to a second terminal, where the first control information includes activation indication information, and the activation indication information indicates to activate one of the at least one first time window. The first terminal stops determining, by sensing the time-frequency resource set, a time-frequency resource for sending the sidelink communication information in the active first time window. The first terminal receives first indication information from the second terminal in the active first time window, where the first indication information indicates at least one time-frequency resource. The first terminal sends first sidelink communication information on the at least one time-frequency resource.

In the method, the first terminal determines that one of the at least one first time window is to be activated. In the active first time window, the first terminal selects, based on an indication of the second terminal, the time-frequency resource for sending the SL information in the active first time window, instead of determining, by sensing the time-frequency resource set, the time-frequency resource for sending the SL information in the active first time window. In this way, energy consumption of sensing can be reduced, and a probability of a conflict between resources for sending the SL information is also reduced.

With reference to the third aspect, in a possible implementation, the first control information includes deactivation indication information, the deactivation indication information indicates to deactivate one of the at least one first time window, and the first terminal determines, in the deactivated first time window by sensing the time-frequency resource set, a time-frequency resource for sending the sidelink communication information. In other words, when the second terminal determines that the first time window is not to be activated, the first terminal determines, by sensing the time-frequency resource set, the time-frequency resource for sending the sidelink communication information.

With reference to the third aspect, in a possible implementation, the first terminal sends second control information to the second terminal, where the second control information indicates to prolong duration of the first time window. In this way, the first terminal does not need to reconfigure a first time window for the second terminal, and the first terminal only needs to prolong the current first time window by a period of time based on a configuration of the current first time window. A procedure of configuring the first time window is faster and more convenient, and resource configuration efficiency is improved.

With reference to the third aspect, in a possible implementation, the first control information is carried on a physical channel.

With reference to the third aspect, in a possible implementation, the second control information is carried on a physical channel.

In an implementation, the physical channel is a physical sidelink feedback channel.

With reference to the third aspect, in a possible implementation, the active first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

According to a fourth aspect, an embodiment of this application provides a communication method. The method may be performed by a terminal device, or may be performed by a component of the terminal device, for example, a processor, a chip, or a chip system of the terminal device. The method includes: A second terminal obtains at least one first time window in a time-frequency resource set, where the time-frequency resource set is used by a terminal to send sidelink communication information. The second terminal receives first control information from a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information. The second terminal sends first indication information to the first terminal in the active first time window, where the first indication information indicates at least one time-frequency resource, and is used by the first terminal to send first sidelink communication information on the at least one time-frequency resource.

In the method, the first terminal determines that one of the at least one first time window is to be activated, and notifies the second terminal. In the active first time window, the first terminal selects, based on an indication of the second terminal, the time-frequency resource for sending the SL information in the active first time window, instead of determining, by sensing the time-frequency resource set, the time-frequency resource for sending the SL information in the active first time window. In this way, energy consumption of sensing can be reduced, and a probability of a conflict between resources for sending the SL information is also reduced.

With reference to the fourth aspect, in a possible implementation, the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

With reference to the fourth aspect, in a possible implementation, the second terminal receives second control information from the first terminal, where the second control information indicates to prolong duration of the first time window. In this way, the first terminal does not need to reconfigure a first time window for the second terminal, and the first terminal only needs to prolong the current first time window by a period of time based on a configuration of the current first time window. A procedure of configuring the first time window is faster and more convenient, and resource configuration efficiency is improved.

With reference to the fourth aspect, in a possible implementation, the first control information is carried on a physical channel.

With reference to the fourth aspect, in a possible implementation, the second control information is carried on a physical channel.

In an implementation, the physical channel is a physical sidelink feedback channel.

With reference to the fourth aspect, in a possible implementation, the active first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

According to a fifth aspect, an embodiment of this application provides a communication method. The method may be performed by a terminal device, or may be performed by a component of the terminal device, for example, a processor, a chip, or a chip system of the terminal device. The method includes: A first terminal receives time window indication information from a second terminal, where the time window indication information indicates a first time window. The first terminal determines the first time window based on first time window information. The first terminal stops determining, by sensing a time-frequency resource set, a time-frequency resource for sending sidelink communication information in the first time window, where the time-frequency resource set is used by a terminal to send the sidelink communication information. The first terminal receives first indication information from the second terminal in the first time window, where the first indication information indicates at least one time-frequency resource. The first terminal sends first sidelink communication information on the at least one time-frequency resource.

In the method, the second terminal indicates the first time window to the first terminal, and the first time window is an active first time window. In the first time window, the first terminal selects, based on an indication of the second terminal, the time-frequency resource for sending the SL information in the first time window, instead of determining, by sensing the time-frequency resource set, the time-frequency resource for sending the SL information in the first time window. In this way, energy consumption of sensing can be reduced, and a probability of a conflict between resources for sending the SL information is also reduced.

With reference to the fifth aspect, in a possible implementation, the method further includes: The first terminal receives control information from the second terminal, where the control information indicates to prolong duration of the first time window.

In this way, the second terminal does not need to reconfigure a first time window for the first terminal, and the first terminal only needs to prolong the current first time window by a period of time based on a configuration of the current first time window. A procedure of configuring the first time window is faster and more convenient, and resource configuration efficiency is improved.

With reference to the fifth aspect, in a possible implementation, the control information is carried on a physical channel. In an implementation, the physical channel is a physical sidelink feedback channel.

With reference to the fifth aspect, in a possible implementation, the first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

With reference to the fifth aspect, in a possible implementation, before the first terminal receives the first indication information from the second terminal in the first time window, the first terminal sends auxiliary information in the first time window, where the auxiliary information is for triggering the second terminal to determine the time-frequency resource used by the first terminal to send the first SL information. The auxiliary information includes at least one of the following: priority information of the to-be-sent first sidelink communication information, size information of the to-be-sent first sidelink communication information, identification information of the first terminal, and identification information corresponding to a receiving end to which the first terminal is to send the first SL information.

According to a sixth aspect, an embodiment of this application provides a communication method. The method may be performed by a terminal device, or may be performed by a component of the terminal device, for example, a processor, a chip, or a chip system of the terminal device. The method includes: A second terminal sends time window indication information to a first terminal, where the time window indication information indicates a first time window. In the first time window, the first terminal stops determining, by sensing a time-frequency resource set, a time-frequency resource for sending sidelink communication information, where the time-frequency resource set is used by a terminal to send the sidelink communication information. The second terminal sends first indication information to the first terminal in the first time window, where the first indication information indicates at least one time-frequency resource used by the first terminal to send first sidelink communication information.

In the method, the second terminal indicates the first time window to the first terminal, and the first time window is an active first time window. In the first time window, the first terminal selects, based on an indication of the second terminal, the time-frequency resource for sending the SL information in the first time window, instead of determining, by sensing the time-frequency resource set, the time-frequency resource for sending the SL information in the first time window. In this way, energy consumption of sensing can be reduced, and a probability of a conflict between resources for sending the SL information is also reduced.

With reference to the sixth aspect, in a possible implementation, the second terminal sends control information to the first terminal, where the second control information indicates to prolong duration of the first time window.

In this way, the second terminal does not need to reconfigure a first time window for the first terminal, and the first terminal only needs to prolong the current first time window by a period of time based on a configuration of the current first time window. A procedure of configuring the first time window is faster and more convenient, and resource configuration efficiency is improved.

With reference to the sixth aspect, in a possible implementation, the control information is carried on a physical channel. In an implementation, the physical channel is a physical sidelink feedback channel.

With reference to the sixth aspect, in a possible implementation, the first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

With reference to the sixth aspect, in a possible implementation, the second terminal determines, by sensing the time-frequency resource set, the time-frequency resource used by the first terminal to send the first sidelink communication information in the first time window. In a possible implementation, the second terminal determines, through scheduling or resource configuration of a network device, the time-frequency resource used by the first terminal to send the first sidelink communication information in the first time window.

According to a seventh aspect, an embodiment of this application provides a communication method. The method may be performed by a terminal device, or may be performed by a component of the terminal device, for example, a processor, a chip, or a chip system of the terminal device. The method includes: A first terminal sends time window indication information to a second terminal, where the time window indication information indicates a first time window. The first terminal stops determining, by sensing a time-frequency resource set, a time-frequency resource for sending sidelink communication information in the first time window, where the time-frequency resource set is used by a terminal to send the sidelink communication information. The first terminal receives first indication information from the second terminal in the first time window, where the first indication information indicates at least one time-frequency resource. The first terminal sends first sidelink communication information on the at least one time-frequency resource.

In the method, the first terminal determines the first time window. In the first time window, the first terminal selects, based on an indication of the second terminal, the time-frequency resource for sending the SL information in the first time window, instead of determining, by sensing the time-frequency resource set, the time-frequency resource for sending the SL information in the first time window. In this way, energy consumption of sensing can be reduced, and a probability of a conflict between resources for sending the SL information is also reduced.

With reference to the seventh aspect, in a possible implementation, the first terminal sends control information to the second terminal, where the control information indicates to prolong duration of the first time window. In this way, the first terminal does not need to reconfigure a first time window for the second terminal, and the first terminal only needs to prolong the current first time window by a period of time based on a configuration of the current first time window. A procedure of configuring the first time window is faster and more convenient, and resource configuration efficiency is improved.

With reference to the seventh aspect, in a possible implementation, the control information is carried on a physical channel. In an implementation, the physical channel is a physical sidelink feedback channel.

With reference to the seventh aspect, in a possible implementation, the first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

According to an eighth aspect, an embodiment of this application provides a communication method. The method may be performed by a terminal device, or may be performed by a component of the terminal device, for example, a processor, a chip, or a chip system of the terminal device. The method includes: A second terminal receives time window indication information from a first terminal, where the time window indication information indicates a first time window. In the first time window, the first terminal stops determining, by sensing a time-frequency resource set, a time-frequency resource for sending sidelink communication information, where the time-frequency resource set is used by a terminal to send the sidelink communication information. The second terminal sends first indication information to the first terminal in the first time window, where the first indication information indicates at least one time-frequency resource, and is used by the first terminal to send first sidelink communication information on the at least one time-frequency resource.

In the method, the first terminal determines the first time window. In the first time window, the first terminal selects, based on an indication of the second terminal, the time-frequency resource for sending the SL information in the first time window, instead of determining, by sensing the time-frequency resource set, the time-frequency resource for sending the SL information in the first time window. In this way, energy consumption of sensing can be reduced, and a probability of a conflict between resources for sending the SL information is also reduced.

With reference to the eighth aspect, in a possible implementation, the second terminal receives control information from the first terminal, where the control information indicates to prolong duration of the first time window. In this way, the first terminal does not need to reconfigure a first time window for the second terminal, and the first terminal only needs to prolong the current first time window by a period of time based on a configuration of the current first time window. A procedure of configuring the first time window is faster and more convenient, and resource configuration efficiency is improved.

With reference to the eighth aspect, in a possible implementation, the control information is carried on a physical channel. In an implementation, the physical channel is a physical sidelink feedback channel.

With reference to the eighth aspect, in a possible implementation, the first time window includes a first sub-time window and a second sub-time window; the first terminal stops sensing the time-frequency resource set in the first sub-time window; and the first terminal senses the time-frequency resource set in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

According to a ninth aspect, an embodiment of this application provides a communication apparatus that can implement the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a tenth aspect, an embodiment of this application provides a communication apparatus, including a processor, where the processor is coupled to a memory, and the memory is configured to store a program or instructions. When the program or the instructions are executed by the processor, the apparatus is enabled to implement the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to an eleventh aspect, an embodiment of this application provides a computer-readable storage medium, where the computer-readable storage medium stores a computer program or instructions. When the computer program or the instructions are executed, a computer is enabled to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to a twelfth aspect, an embodiment of this application provides a computer program product, where the computer program product includes computer program code. When the computer program code is run on a computer, the computer is enabled to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to a thirteenth aspect, an embodiment of this application provides a chip, including a processor, where the processor is coupled to a memory, and the memory is configured to store a program or instructions. When the program or the instructions are executed by the processor, the chip is enabled to implement the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

It may be understood that any communication apparatus, chip, computer-readable storage medium, or computer program product, or the like provided above is configured to perform a corresponding method provided above. Therefore, for beneficial effects that can be achieved by the communication apparatus, the chip, the computer-readable storage medium, the computer program product, or the like, refer to beneficial effects in the corresponding method. Details are not described herein again.

DETAILED DESCRIPTION OF ILLUSTRATIVE EMBODIMENTS

Figure 1:
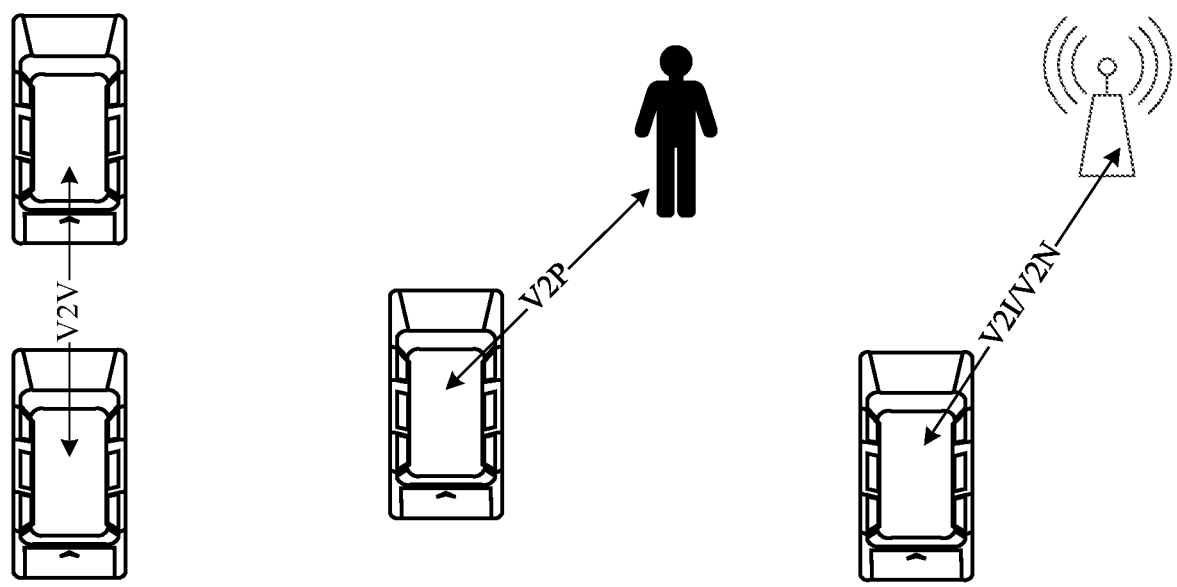
FIG. 1 is a schematic diagram of a scenario to which a technical solution according to an embodiment of this application is applicable.

A technical solution provided in this application may be applied to a system, for example, V2X and device-to-device (D2D), in which user ends directly communicate with each other. The technical solution provided in embodiments of this application may be applied to a system architecture shown in FIG. 2. The system architecture may include a network device 200 and a plurality of terminal devices 100 connected to the network device 200. Direct communication between the plurality of terminal devices 100 is referred to as a sidelink communication manner. In some examples, as shown in (a) in FIG. 2, the plurality of terminal devices 100 are within network coverage of the network device 200, and each terminal device 100 may receive scheduling of the network device 200, and obtain configuration information, control signaling, and the like from the network device 200. The terminal devices 100 communicate with each other in the sidelink communication manner. In some examples, as shown in (b) in FIG. 2, at least one terminal device 100 is within network coverage of the network device 200, and at least one terminal device 100 is outside the network coverage of the network device 200. The terminal device 100 within the network coverage of the network device 200 may receive scheduling of the network device 200, and obtain configuration information, control signaling, and the like from the network device 200. The terminal devices 100 communicate with each other in the sidelink communication manner. In some examples, as shown in (c) in FIG. 2, the plurality of terminal devices 100 are in a communication scenario without network coverage. The terminal devices 100 communicate with each other in the sidelink communication manner.

Uu (UTRAN-to-UE) air interface transmission is used between the terminal devices 100 and the network device 200, and near field communication PC-5 air interface transmission or sidelink (SL) air interface transmission is used between the terminal devices 100.

The network device 200 may be a macro evolved NodeB (eNB) in a universal mobile telecommunication system/long term evolution (UMTS/LTE) wireless communication system, may be a micro evolved NodeB eNB in a heterogeneous network (heterogeneous network, HetNet), may be a base band unit (BBU) and a remote radio unit (RRU) in a distributed base station network, may be a baseband unit pool (BBU pool) and an RRU in a cloud radio access network (CRAN), or may be a gNB in a future wireless communication system.

The terminal device 100 may be an access terminal, a UE (user equipment) unit, a UE station, a mobile station, a remote station, a remote terminal, a mobile device, a UE terminal, a UE agent, a UE apparatus, or the like. The access terminal may be a cellular phone, a cordless phone, a session initiation protocol (SIP) phone, a wireless local loop (WLL) station, a personal digital assistant (PDA), a handheld device (for example, a mobile phone or a tablet computer) having a wireless communication function, a wearable device, a computing device, another processing device connected to a wireless modem, a vehicle-mounted device, a vehicle-mounted communication module, another embedded communication module, a terminal in a 5G network, a terminal in a future evolved PLMN, or the like.

Figure 2:
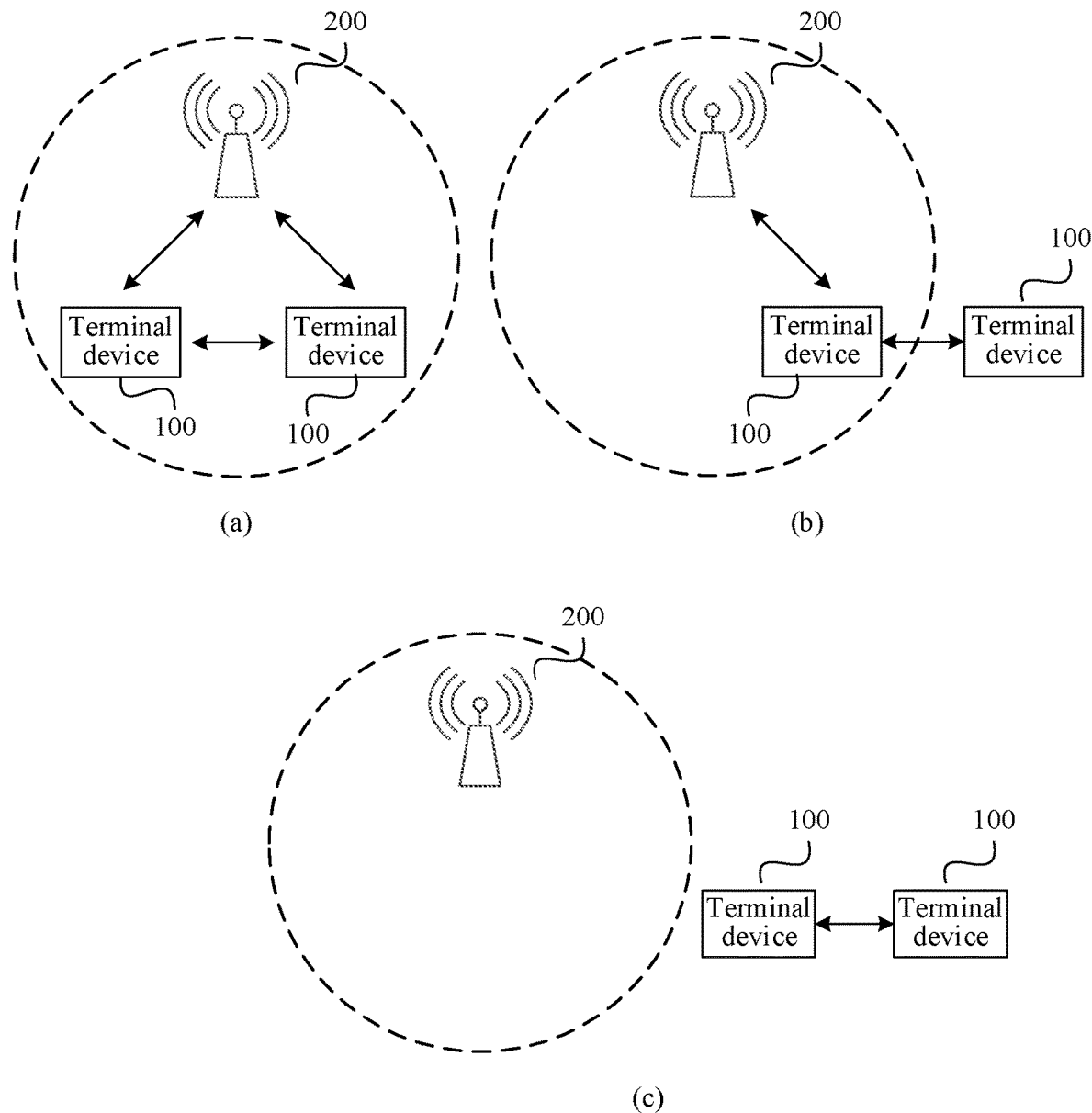
FIG. 2 is a schematic diagram of a system architecture to which a technical solution according to an embodiment of this application is applicable.

It should be noted that the system architecture shown in FIG. 2 is merely used as an example and is not intended to limit the technical solution in this application. A person skilled in the art should understand that, in a specific implementation process, the system architecture may further include another device (for example, a core network). In addition, quantities of the terminal devices 100 and network devices 200 may be configured based on a specific requirement.

A communication method and apparatus that are provided in embodiments of this application may be applied to a terminal device. The terminal device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). An operating system may be any one or more computer operating systems that implement service processing by using a process. The application layer includes applications such as a browser, an address book, text processing software, and instant messaging software. In addition, in embodiments of this application, a specific structure of an execution body of the communication method is not particularly limited in embodiments of this application, provided that a program that records code of the communication method in embodiments of this application can be run to perform communication according to the communication method in embodiments of this application. For example, the communication method provided in embodiments of this application may be performed by the terminal device, a function module that is in the terminal device and that can invoke a program and execute the program, or an apparatus, for example, a chip, used in the terminal device. This is not limited in this application.

Figure 3:
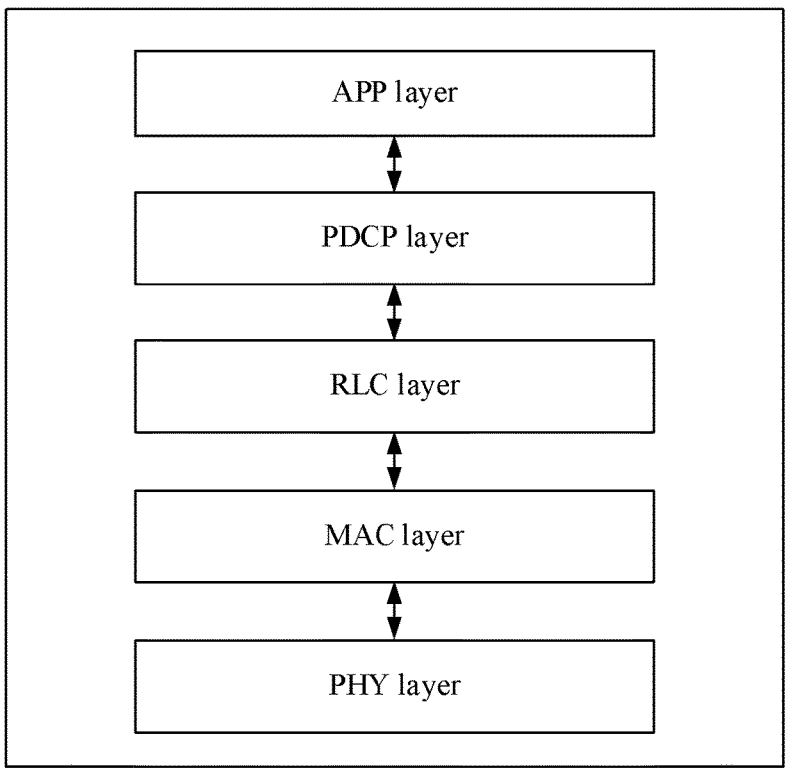
FIG. 3 is a schematic diagram of a structure of a terminal device to which a technical solution according to an embodiment of this application is applicable.

Optionally, a structure of a protocol stack of the terminal device 100 in this embodiment of this application is shown in FIG. 3. From bottom to top, the protocol stack includes a physical (PHY) layer, a media access control (MAC) layer, a radio link control (RLC) layer, a packet data convergence protocol (PDCP) layer, and an application (APP) layer successively. The physical layer is mainly for telecommunication physical layer functions, such as modulation, demodulation, and multiple-antenna mapping. The MAC layer is mainly for uplink and downlink scheduling and hybrid automatic repeat request (HARQ) retransmission. The RLC layer is mainly for segmentation and retransmission processing, and sequence control of higher layer data. The PDCP layer is mainly for header compression and decompression, to reduce bit traffic that needs to be transferred through a wireless interface. The APP layer includes a series of application packages, such as applications such as Camera, Gallery, Calendar, Phone, Maps, Navigation, Bluetooth, Music, Videos, and Messages.

In embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

A scheduling mode or an autonomous resource selection mode may be used for a resource allocation manner of sidelink communication between terminal devices. In scheduling mode, the terminal device sends and receives sidelink communication information by using a transmission resource allocated by a network device. In autonomous resource selection mode, the terminal device determines a transmission resource for sending and receiving the sidelink communication information.

In an implementation, in autonomous resource selection mode, the terminal device determines, by sensing a time-frequency resource set, a time-frequency resource for sending the sidelink communication information. The time-frequency resource set is a set of resources for sending the sidelink communication information between the terminal devices in a network. The time-frequency resource set may also be referred to as a resource pool or a set of time-frequency resources included in a sidelink bandwidth part (SL BWP). The time-frequency resource set includes resources such as a time domain resource, a frequency domain resource, and/or a code domain resource. The time domain resource in the time-frequency resource set includes one or more time units. One time unit may be one symbol, a plurality of symbols, one slot, one subframe, one frame, or the like. The one or more time units may be consecutive in terms of time, or may be discrete. The frequency domain resource in the time-frequency resource set includes one or more frequency domain units. One frequency domain unit may be one resource element (RE), a plurality of REs, one resource block (RB), a plurality of RBs, one subchannel, a plurality of subchannels, or the like. One subchannel includes one or more consecutive or non-consecutive RBs in frequency domain. In embodiments of this application, descriptions are provided by using an example in which the time unit is the slot and the frequency domain unit is the subchannel. It may be understood that the communication method provided in embodiments of this application is also applicable to another time unit and another frequency domain unit.

Figure 4:
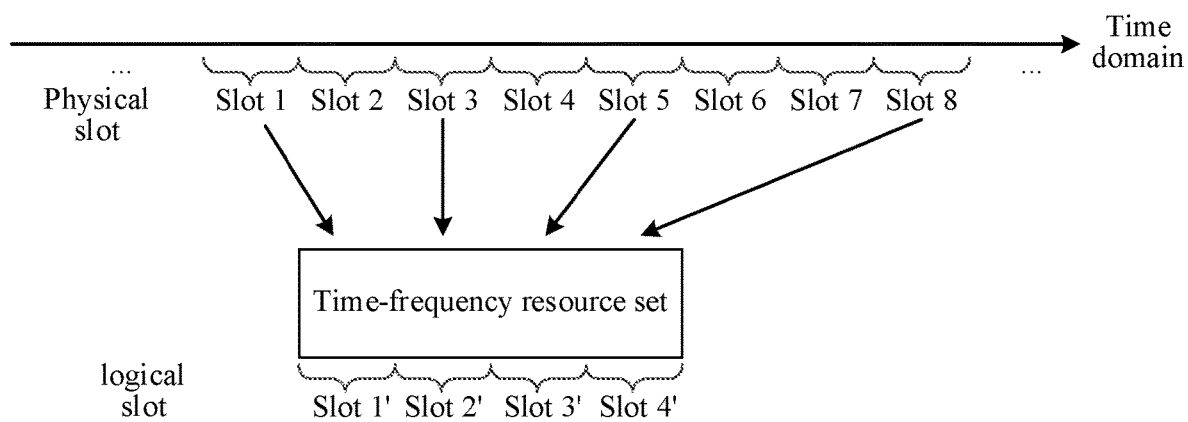
FIG. 4 is a schematic diagram 1 of a communication method according to an embodiment of this application.

In one time-frequency resource set, time units are logically consecutive. As shown in FIG. 4, a slot 1 to a slot 8 are physically consecutive slots in terms of time, namely, physical slots. The slot 1, the slot 3, the slot 5, and the slot 8 are configured to belong to one time-frequency resource set. In the time-frequency resource set, the slot 1 (a slot 1'), the slot 3 (a slot 2'), the slot 5 (a slot 3'), and the slot 8 (a slot 4') are logically consecutive slots. It may be understood that the consecutive slots in embodiments of this application are logically consecutive slots.

The terminal device may obtain a time-frequency resource set from the network device, or may use a preconfigured time-frequency resource set. For example, a terminal device within network coverage of the network device may obtain time-frequency resource set configuration information by receiving a system information block (SIB), cell-specific radio resource control (RRC) signaling, or UE-specific RRC signaling of the network device, and obtain the time-frequency resource set based on the time-frequency resource set configuration information. For example, outside the network coverage of the network device, the terminal device may obtain the time-frequency resource set by using preconfigured time-frequency resource set configuration information.

In an example, a method in which the terminal device determines, by sensing the time-frequency resource set, the transmission resource for sending the sidelink communication information may include:

A first terminal triggers a resource selection process at a moment in a slot n, to determine a time-frequency resource for sending to-be-sent first SL information. SL information includes at least one of a physical sidelink shared channel (PSSCH), a physical sidelink control channel (PSCCH), a physical broadcast control channel (PSBCH), a physical sidelink feedback channel (PSFCH), and a physical sidelink data channel (PSDCH). A type of a service carried on the PSSCH may include a unicast communication type, a multicast communication type, and/or a broadcast communication type.

It should be understood that, in this application, an expression [A, B] represents a value range including the boundary points A and B, and an expression (A, B) represents a value range including neither of the boundary points A and B. Likewise, an expression [A, B) represents a value range that includes the boundary point A but does not include the boundary point B, and an expression (A, B] represents a value range that does not include the boundary point A but includes the boundary point B. Details thereof are not described again in other parts of this specification.

The first terminal receives SL information (for example, the PSCCH or the PSCCH and the PSSCH) from another terminal in the network in a time-frequency resource set in a sensing window (for example, slots $[n-T_0, n-T_{proc,0}^{SL}]$). $T_0$ is configured by the network device or preconfigured, and $T_{proc,0}^{SL}$ is determined by the terminal based on Table 1. $\mu_{SL}$ in the table is related to a sub-carrier spacing (SCS) corresponding to an SL bandwidth part (BWP) of the terminal, and $\mu_{SL}$ may be understood as an SCS configuration parameter of the SL BWP. Specifically, a correspondence between the sub-carrier spacing SCS and $\mu_{SL}$ is shown in Table 2 below. The terminal may determine the parameter $T_{proc,0}^{SL}$ based on Table 1 and Table 2, where Table 1 and Table 2 are predefined in a protocol. In an understandable manner, that the terminal device determines, by sensing the time-frequency resource set, the transmission resource for sending the sidelink communication information specifically means determining, by sensing the time-frequency resource set in the sensing window in the time-frequency resource set, the transmission resource for sending the sidelink communication information.

TABLE 1

| $\mu_{SL}$ | $T_{proc,0}^{SL}$ [slots] |
|---|---|
| 0 | 1 |
| 1 | 1 |
| 2 | 2 |
| 3 | 4 |

TABLE 2

| $\mu_{SL}$ | $\Delta f = 2^\mu \cdot 15$[kHz] |
|---|---|
| 0 | 15 |
| 1 | 30 |
| 2 | 60 |
| 3 | 120 |
| 4 | 240 |

In an example, the first terminal detects and decodes sidelink control information (SCI) on the PSCCH. One piece of SCI may be for scheduling at least one time of side transmission. For example, the piece of SCI is for scheduling three times of side transmission. The first time of side transmission is initial transmission of data carried on one PSSCH, and the last two times of side transmission are retransmission of the data. For another example, the piece of SCI is for scheduling three times of side transmission, and the three times of side transmission are all retransmission of one piece of data. The SCI obtained by the first terminal through detection includes time domain and/or frequency domain resource information of the scheduled side transmission, periodic time-frequency resource information (which may be indicated by a field "resource reservation period") reflecting a data service period, priority information, and the like. Specifically, the priority information may indicate priority information corresponding to the PSSCH. In other words, at a first moment, a terminal (2) in the network reserves a time-frequency resource in a selection window by sending one piece of SCI, to perform new transmission or retransmission of to-be-sent data, where a slot range of the selection window is $[n+T_1, n+T_2]$, $n+T_1$ is a start slot number, $n+T_2$ is an end slot number, and $T_1$ and $T_2$ are determined based on a data delay of the terminal. Then, the first terminal obtains the SCI through detection, and learns, by decoding the SCI, of a time-frequency resource reservation status of the terminal 2 in the selection window. The first terminal avoids selecting, in the selection window to send the SL information, a time-frequency resource reserved by the another terminal, to reduce a resource collision.

If the following conditions are all satisfied, the first terminal excludes the time-frequency resource that is reserved by the terminal 2 and that is in the selection window from the time-frequency resource that may be for sending the first SL information, that is, excludes an unavailable time-frequency resource:

1. The terminal receives SCI in a slot $t_m^{SL}$. A field "resource reservation period" (if the field "resource reservation period" exists) in the SCI indicates a value $P_{rsvp\_RX}$, and a field "priority" in the SCI indicates a value $prio_{RX}$, where the value $P_{rsvp\_RX}$ is a period of a PSSCH corresponding to the SCI, and the value $prio_{RX}$ is a priority value of the PSSCH corresponding to the SCI.

2. An RSRP measurement result determined by the terminal based on the SCI is higher than a threshold $Th_{prioTX,prioRX}$, where the threshold $Th_{prioTX,prioRX}$ is a function that is for indicating the priority value and a priority value corresponding to to-be-sent data of the terminal and that is in the received SCI.

3. A reserved time-frequency resource determined based on the SCI received by the terminal in the slot $t_m^{SL}$ overlaps a time-frequency resource in the selection window.

After excluding the unavailable time-frequency resource in the resource selection window of the first terminal, the first terminal may determine that a remaining time-frequency resource in the resource selection window is an available time-frequency resource, thereby selecting, from the available time-frequency resource, the time-frequency resource for sending the to-be-sent first SL information.

In some implementations, a quantity of times of sensing performed by the first terminal in the sensing window may be reduced, to save power of the terminal. For example, different from sensing a slot in the sensing window (for example, the slots $[n-T_0, n-T_{proc,0}^{SL})$), sensing (which is referred to as partial sensing) is performed only in a partial slot before the slot n; and the time-frequency resource for sending the first SL information is determined based on a result of the partial sensing. For example, the first terminal does not perform sensing, and selects, in a random selection manner, the time-frequency resource for sending the first SL information.

In the foregoing method, when the first terminal cannot obtain a complete sensing result or does not perform sensing, a probability of a collision or a conflict between selected time-frequency resources is increased, and reliability of SL transmission is reduced.

An embodiment of this application provides a communication method, to reduce a probability of a conflict between time-frequency resources for sending sidelink communication information.

Figure 5:
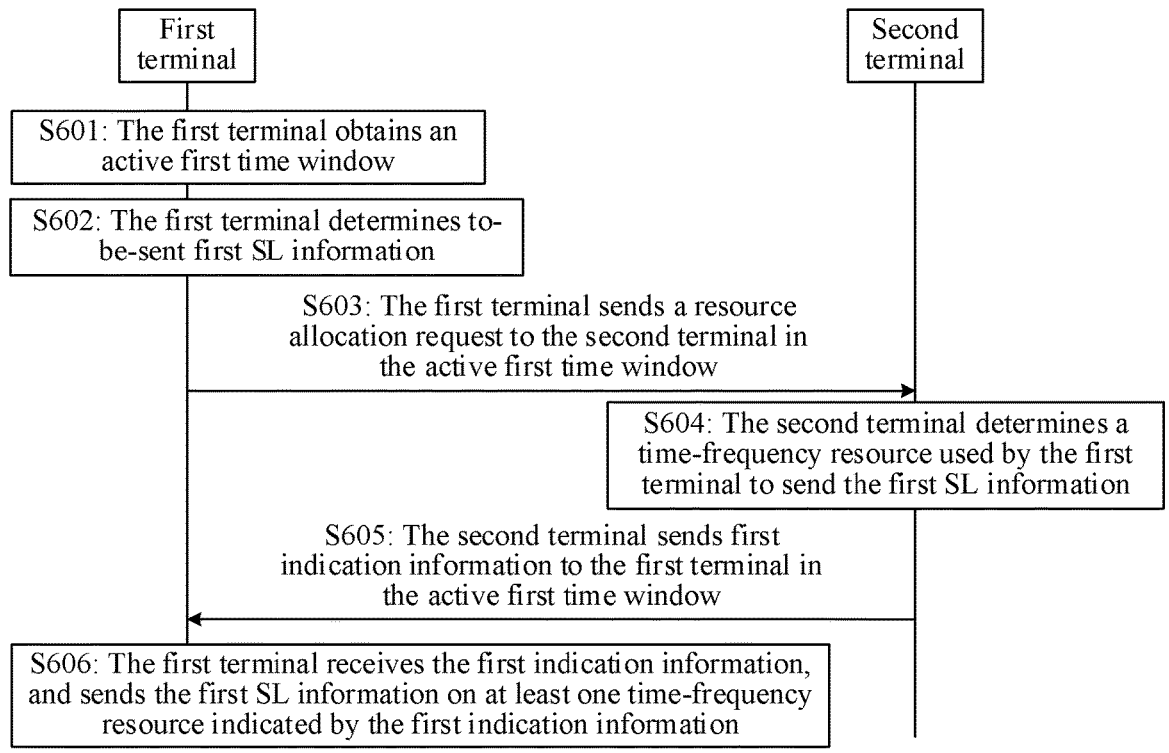
FIG. 5 is a schematic flowchart 1 of a communication method according to an embodiment of this application.

As shown in FIG. 5, the communication method provided in this embodiment of this application may include the following steps.

S601: A first terminal obtains an active first time window.

In this embodiment of this application, a network device or a terminal configures one or more slots in time domain in a time-frequency resource set as one coordination window (a first time window), or the one or more slots in time domain in the time-frequency resource set are preconfigured as one first time window. The first time window is used by the terminal device to determine, in the time-frequency resource set based on an indication of an auxiliary terminal, a time-frequency resource for sending SL information. Specifically, at least one first time window may be configured in the time-frequency resource set. Further, the terminal device may activate the configuration, or may deactivate the configuration.

In the active first time window, the first terminal stops determining, by sensing the time-frequency resource set, the time-frequency resource for sending the SL information, but determines, in the time-frequency resource set based on an indication of an auxiliary terminal (a second terminal), the time-frequency resource for sending the SL information. In a deactivated first time window, the first terminal determines, by sensing the time-frequency resource set, the time-frequency resource for sending the SL information, instead of determining, in the time-frequency resource set based on the indication of the auxiliary terminal (the second terminal), the time-frequency resource for sending the SL information.

An inter-terminal coordination connection is established between the first terminal and the second terminal. In this case, the first terminal and the second terminal exchange coordination information via signaling. For example, the signaling includes PC5-RRC, an SL MAC CE, or SCI, or may include information that is provided by an APP layer of the first terminal for a MAC layer and a PHY layer and that is for establishing the connection between the first terminal and the second terminal. The coordination information includes identification information of the first terminal and the second terminal, and is used by the first terminal and the second terminal to identify each other or data of each other. The first terminal and the second terminal belong to one coordination peer end or one coordination group, or belong to one group of coordination data/services.

In some embodiments, the active first time window includes a first sub-time window. In the first sub-time window, the first terminal stops sensing the time-frequency resource set, and stops determining, by sensing the time-frequency resource set, a time-frequency resource for sending the SL information in the first sub-time window, but determines, in the time-frequency resource set based on the indication of the second terminal, the time-frequency resource for sending the SL information in the active first time window.

In some embodiments, the active first time window further includes a second sub-time window. In the second sub-time window, the first terminal senses the time-frequency resource set, but does not determine, by sensing the time-frequency resource set, a time-frequency resource for sending the SL information in the second sub-time window, but determines, in the time-frequency resource set based on the indication of the second terminal, the time-frequency resource for sending the SL information in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained. It should be noted that, in this embodiment of this application, the sensing includes resource selection manners in which resource selection is performed through sensing and partial-sensing. Partial-sensing means sensing some non-consecutive or consecutive slots. The non-consecutive or consecutive slots may be determined based on a resource reservation period and/or a quantity of slots that can be indicated by one piece of SCI (for example, the piece of SCI may indicate a resource of a maximum of 32 slots), and/or configured by the network device or preconfigured. In this embodiment of this application, the sensing further includes a resource selection manner in which a terminal in DRX (discontinuous reception) mode performs resource selection based on sensing, that is, SCI sensing is not performed on a resource in a DRX-OFF (or DRX inactive state) time period; or includes any other case in which a resource selection manner is obtained based on a mode other than a sensing mode.

Figure 6:
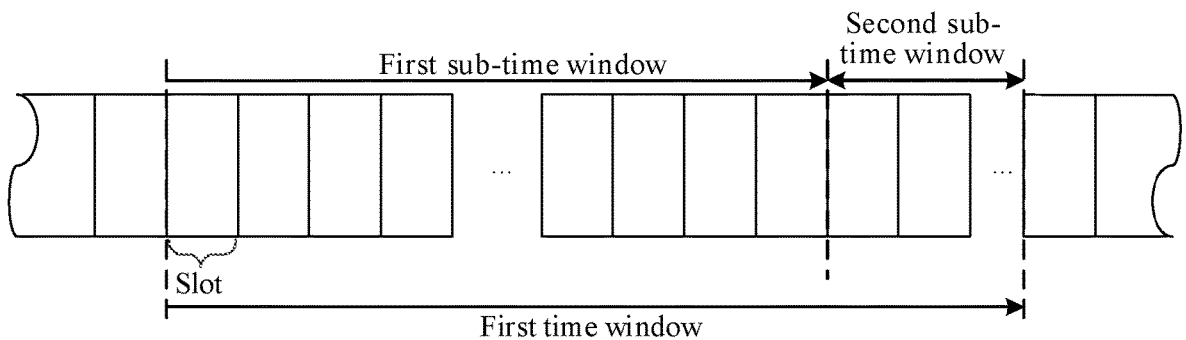
FIG. 6 is a schematic diagram 2 of a communication method according to an embodiment of this application.

For example, as shown in FIG. 6, the first time window includes the first sub-time window and the second sub-time window. The first sub-time window and the second sub-time window do not overlap in terms of time, the second sub-time window is after the first sub-time window, and a length of the coordination window is equal to a sum of a length of the first sub-time window and a length of the second sub-time window.

The first terminal obtains first time window information. The first time window information includes a quantity of slots included in the first time window. The slot may be a physical slot. For example, the first time window is a length of a system frame number (SFN) or a direct frame number (DFN), or a length of q SFNs, where q is a positive integer greater than 1. For example, the first time window is 1000 ms, 2000 ms, 3000 ms, 4000 ms, 5000 ms, 6000 ms, 7000 ms, 8000 ms, 9000 ms, 1000 ms, or 10240 ms. The slot may alternatively be a logical slot in the time-frequency resource set, and is converted from a physical slot. The first time window information further includes at least one piece of information in information such as a start position of the first time window and information about a spacing between adjacent first time windows. The start position of the first time window may be an offset value relative to an SFN 0 or a DFN 0, or an offset value relative to receiving information sent by the second terminal.

If the first time window includes the first sub-time window, the first terminal further obtains first sub-time window information. The first sub-time window information includes a quantity of slots included in the first sub-time window or a physical time length. The slot may be a physical slot; or may be a logical slot in the time-frequency resource set, and is converted from a physical slot. A unit of the physical time length is millisecond or second. For example, the physical time length is a length of one system frame number (SFN) or a direct frame number (DFN), or a length of q SFNs, where q is a positive integer greater than 1. For example, the coordination window is 1000 ms, 2000 ms, 3000 ms, 4000 ms, 5000 ms, 6000 ms, 7000 ms, 8000 ms, 9000 ms, 1000 ms, or 10240 ms. In an example, a start position of the first sub-time window is the same as the start position of the first time window. Optionally, the first sub-time window information may further include at least one piece of information in information such as the start position of the first sub-time window and information about a spacing between adjacent first sub-time windows. The start position of the first sub-time window may be an offset value relative to the SFN 0, the DFN 0, or the start position of the first time window, or an offset value relative to receiving the information sent by the second terminal.

Optionally, if the first time window includes the second sub-time window, the first terminal further obtains second sub-time window information. The second sub-time window information includes a quantity of slots included in the second sub-time window or a physical time length. The slot may be a physical slot; or may be a logical slot in the time-frequency resource set, and is converted from a physical slot. A unit of the physical time length is millisecond or second. For example, the physical time length is a length of one system frame number (SFN) or a direct frame number (DFN), or a length of q SFNs, where q is a positive integer greater than 1. For example, the coordination window is 1000 ms, 2000 ms, 3000 ms, 4000 ms, 5000 ms, 6000 ms, 7000 ms, 8000 ms, 9000 ms, 1000 ms, or 10240 ms. In an example, a start position of the second sub-time window is after an end position of the first time window, and the start position of the second sub-time window is adjacent to an end position of the first sub-time window in terms of time. Optionally, the second sub-time window information further includes at least one piece of information in information such as the start position of the second sub-time window and information about a spacing between adjacent second sub-time windows. The start position of the second sub-time window may be an offset value relative to the SFN 0, the DFN 0, the start position of the first time window, or the ending position of the first sub-time window, or an offset value relative to receiving the information sent by the second terminal.

It may be understood that, if the first time window includes only the first sub-time window, that is, the length of the first time window is equal to the length of the first sub-time window, the first terminal obtains at least one of the first time window information and the first sub-time window information. If the first time window includes the first sub-time window and the second sub-time window, that is, the length of the first time window is equal to the sum of the length of the first sub-time window and the length of the second sub-time window, the first terminal obtains at least two of the first time window information, the first sub-time window information, and the second sub-time window information.

The first terminal may obtain the first time window information from the network device via RRC information, SIB information, or MIB information, obtain the first time window information from the second terminal via PC5-RRC information, a MAC CE, SCI, or SFCI, or determine the first time window information.

S602: The first terminal determines to-be-sent first SL information.

The first terminal determines the to-be-sent first SL information, where the first SL information may be a to-be-newly-transmitted service/to-be-newly-transmitted data or a to-be-retransmitted service/to-be-retransmitted data. The first terminal may further determine information such as a data type, a data size, and a data receiving end of the to-be-sent first SL information.

S603: The first terminal sends a resource allocation request to the second terminal in the active first time window.

The resource allocation request requests the second terminal to allocate a time-frequency resource used by the first terminal to send the first SL information.

S604: The second terminal determines the time-frequency resource used by the first terminal to send the first SL information.

As the auxiliary terminal of the first terminal, the second terminal determines, by sensing the time-frequency resource set, the time-frequency resource used by the first terminal to send the first SL information. For example, the second terminal receives SL information (for example, a PSCCH or the PSCCH and a PSSCH) from another terminal in the time-frequency resource set in a sensing window, and obtains a time-frequency resource reservation status of the another terminal, to determine an idle time-frequency resource in the time-frequency resource set. The second terminal determines, in the idle time-frequency resource in the time-frequency resource set, the time-frequency resource used by the first terminal to send the first SL information.

In some embodiments, the resource allocation request includes auxiliary information, and the auxiliary information is used by the second terminal to determine the time-frequency resource used by the first terminal to send the first SL information. For example, the auxiliary information may include at least one of priority information of the first SL information to be sent by the first terminal, size information of the to-be-sent first SL information, the identification information of the first terminal, and identification information corresponding to the receiving end to which the first terminal is to send the first SL information. The size information of the to-be-sent first SL information may be a transport block size (TBS), a buffer status report (BSR), or information about a subchannel for carrying the to-be-sent first SL information (where for example, the information about the subchannel may indicate a quantity of subchannels and/or slots that the to-be-sent first SL information needs to occupy). The identification information may be identification information that identifies a terminal, or identification information of data/a service of the first SL information to be sent by the terminal. The identification information may identify a sender or a receiver of the first SL information. The identification information may be at least a part of a piece of complete identification information.

The second terminal receives the auxiliary information, and determines, in the idle time-frequency resource in the time-frequency resource set based on the auxiliary information, the time-frequency resource used by the first terminal to send the first SL information. Optionally, the second terminal may receive resource indication information of the network device from the network device, and determine, based on the resource indication information received from the network device, the time-frequency resource used by the first terminal to send the first SL information.

S605: The second terminal sends first indication information to the first terminal in the active first time window.

The second terminal sends the first indication information to the first terminal in a first time-frequency unit in the active first time window, where the first indication information indicates at least one time-frequency resource used by the first terminal to send the first SL information. In some examples, the at least one time-frequency resource is in the active first time window in time domain. The first time-frequency unit may be a time-frequency resource set including one slot and one subchannel, or may be a time-frequency resource set including one or more slots and one or more subchannels.

In an implementation, the first terminal and the second terminal separately receive first configuration information of the network device, where the first configuration information includes first time-frequency unit indication information indicating the first time-frequency unit. The first terminal and the second terminal separately obtain the first time-frequency unit based on the first time-frequency unit indication information. For example, the first terminal and the second terminal separately receive at least one of a SIB, a master information block (master information block, MIB), RRC, downlink control information (DCI), and a MAC control element (CE) that are of the network device, to obtain the first configuration information.

In another implementation, the first terminal and the second terminal obtain the first time-frequency unit based on a preconfigured parameter.

In another implementation, the second terminal senses the time-frequency resource set, receives first configuration information of the network device, or obtains the first time-frequency unit based on a preconfigured parameter; and sends first time-frequency unit indication information to the first terminal. For example, the second terminal sends the first time-frequency unit indication information to the first terminal via at least one message in an SL-MIB, PC5-RRC, SCI, side feedback control information (SFCI), and an SL MAC CE. The first terminal obtains the first time-frequency unit based on the first time-frequency unit indication information.

In another implementation, the first terminal senses the time-frequency resource set, receives first configuration information of the network device, or obtains the first time-frequency unit based on a preconfigured parameter; and sends first time-frequency unit indication information to the second terminal. For example, the first terminal sends the first time-frequency unit indication information to the second terminal via at least one message in an SL-MIB, PC5-RRC, SCI, SFCI, or an SL MAC CE. The second terminal obtains the first time-frequency unit based on the first time-frequency unit indication information.

S606: The first terminal receives the first indication information, and sends the first SL information on the at least one time-frequency resource indicated by the first indication information.

The first terminal receives the first indication information in the active first time window, and sends the first SL information on the at least one time-frequency resource indicated by the first indication information.

According to the communication method provided in this embodiment of this application, in the first time window (the coordination window), the first terminal selects, based on the indication of the auxiliary terminal (the second terminal), the time-frequency resource for sending the SL information in the first time window, instead of determining, by sensing the time-frequency resource set, the time-frequency resource for sending the SL information in the first time window. In this way, energy consumption of sensing can be reduced, and the time-frequency resource for sending the SL information can be determined based on the indication of the second terminal. In this way, a resource does not need to be selected based on incomplete information that is sensed, and a probability of a conflict between resources for sending the SL information is reduced.

Figure 7:
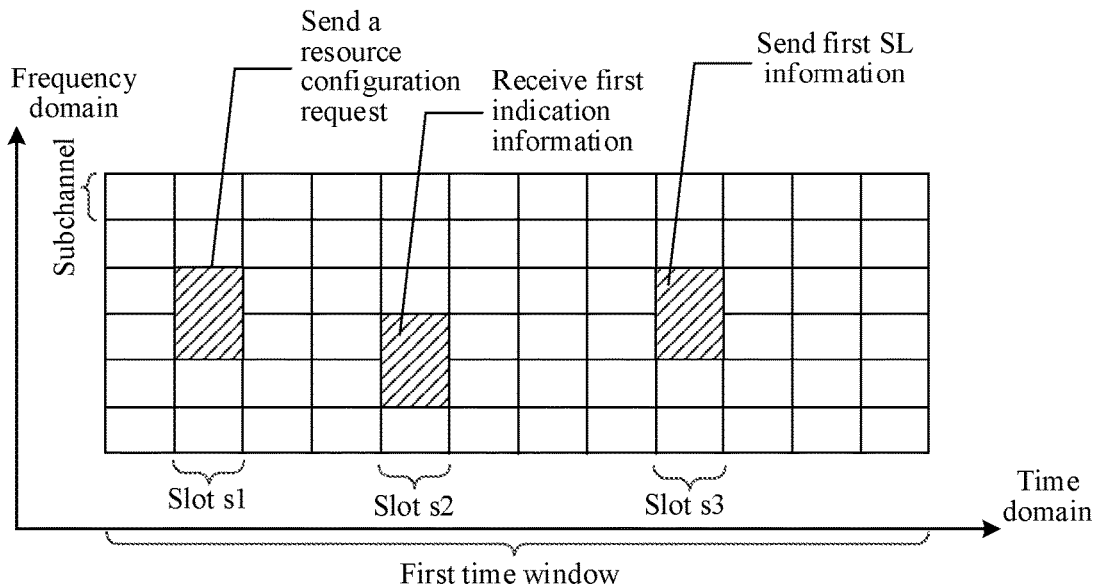
FIG. 7 is a schematic diagram 3 of a communication method according to an embodiment of this application.

For example, as shown in FIG. 7, the first terminal obtains the first time window (where the first time window is activated). The first terminal sends a resource configuration request to the auxiliary terminal (the second terminal) on a first time-frequency resource (where a time domain resource in the first time-frequency resource is a slot s1) in the first time window, to request the second terminal to determine the time-frequency resource used by the first terminal to send the first SL information. The first terminal determines, based on a preconfigured parameter, to receive the first indication information in a slot s2. The first terminal obtains the first indication information on a second time-frequency resource (where a time domain resource in the second time-frequency resource is a slot s2), and determines, based on the first indication information, to send the first SL information on a third time-frequency resource (where a time domain resource in the third time-frequency resource is a slot s3). The first terminal selects, based on the indication of the second terminal, the time-frequency resource for sending the SL information in the first time window.

Figure 8:
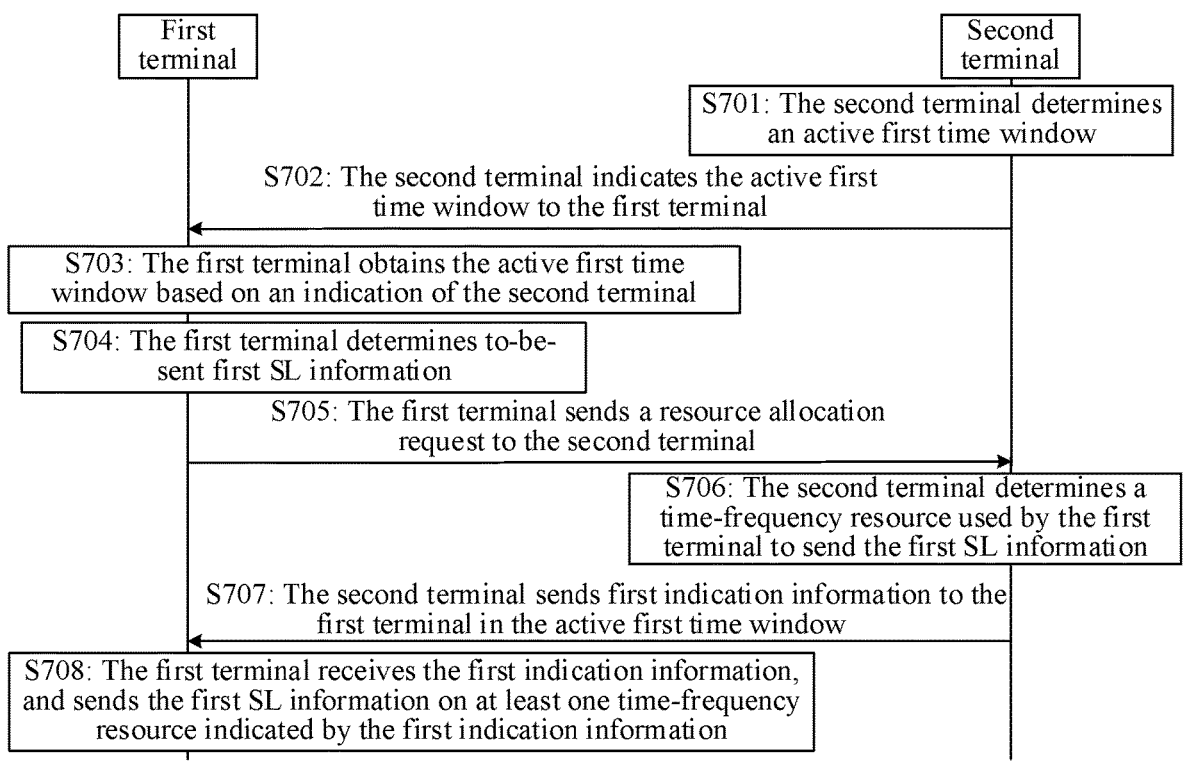
FIG. 8 is a schematic flowchart 2 of a communication method according to an embodiment of this application.

In some embodiments, a second terminal determines an active first time window, and a first terminal obtains the active first time window based on an indication of the second terminal. That is, the second terminal determines a time period in which the first terminal stops determining, by sensing a time-frequency resource set, a time-frequency resource for sending sidelink communication information. As shown in FIG. 8, a communication method provided in an embodiment of this application includes the following steps.

S701: A second terminal determines an active first time window.

In some examples, a network device or a terminal configures one or more slots in time domain in a time-frequency resource set as one coordination window (a first time window), or the one or more slots in time domain in the time-frequency resource set are preconfigured as one first time window. Specifically, at least one first time window may be configured in the time-frequency resource set. The second terminal determines that one first time window is to be activated. In the active first time window, a first terminal stops determining, by sensing the time-frequency resource set, a time-frequency resource for sending sidelink communication information. For example, if the second terminal can determine a time-frequency resource set reservation usage status of another terminal in a first time period through sensing, or the second terminal can obtain a time-frequency resource in the time-frequency resource set in a first time period through scheduling or resource configuration of the network device, so that the first time period may be determined as the active first time window.

S702: The second terminal indicates the active first time window to the first terminal.

In an implementation, the second terminal obtains at least one first time window in the time-frequency resource set. The at least one first time window may be configured by the network device, preconfigured, or predefined. The first terminal obtains the at least one first time window in the time-frequency resource set. The at least one first time window may be configured by the network device, preconfigured, predefined, or indicated by the second terminal. Optionally, configuration information of the at least one first time window remains unchanged in a period of time. The second terminal dynamically activates or deactivates one of the at least one first time window. If the first time window is activated, the first time window is the active first time window, the first terminal stops determining, by sensing the time-frequency resource set, the time-frequency resource for sending the sidelink communication information in the active first time window, but determines, in the time-frequency resource set based on an indication of the second terminal, the time-frequency resource for sending the SL information in the active first time window. If the first time window is deactivated, the first time window is a deactivated first time window, and the first terminal determines, by sensing the time-frequency resource set, a time-frequency resource for sending the sidelink communication information in the deactivated first time window, instead of determining, in the time-frequency resource set based on an indication of the second terminal, the time-frequency resource for sending the SL information in the deactivated first time window. For example, the second terminal sends first control information to the first terminal, where the first control information includes activation indication information, indicating to activate one of the at least one first time window; and the first control information may further include deactivation indication information, indicating to deactivate one of the at least one first time window. The second terminal may determine, based on a channel status (including a channel congestion status, a channel interference level, and/or the like) and/or a quantity for determining whether the second terminal has abundant basic allocated time-frequency resources, to activate or deactivate the first time window. The channel congestion status may be determined based on a channel busy ratio (CBR) and/or a channel occupancy ratio measured by the second terminal. Specifically, a CBR threshold and/or a CR threshold are/is set. Optionally, the CBR threshold and/or the CR threshold may be related to a priority. The CBR threshold and/or the CR threshold may be configured by the network device, preconfigured, or predefined. When the measured CBR is greater than the CBR threshold and/or the measured CR is greater than the CR threshold, it is determined that channel congestion occurs, and the second terminal activates the first time window. When the channel congestion occurs, and the first terminal determines, by sensing the time-frequency resource set, the time-frequency resource for sending the SL information in the active first time window, a resource collision probability is increased. The time-frequency resource for sending the SL information in the active first time window is selected based on the indication of the second terminal, so that benefit of central scheduling of the second terminal is obtained, and resource collision is reduced. The channel interference level may be determined based on a NACK received by the second terminal or determining of discontinuous transmission (DTX). A condition for determining the DTX is that HARQ feedback information is not correctly received (where an ACK or a NACK is not correctly received) on a resource on which a HARQ feedback should be received. Specifically, when a quantity of NACKs continuously received by the second terminal in a period of time exceeds a first NACK threshold, a total quantity of NACKs received by the second terminal in a period of time exceeds a second NACK threshold, and/or the DTX determined by the second terminal in a period of time exceeds a DTX threshold, it is determined that the channel interference level is high, and the second terminal activates the first time window. Optionally, the first NACK threshold, the second NACK threshold, and/or the DTX threshold may be related to the priority. The first NACK threshold, the second NACK threshold, and/or the DTX threshold may be configured by the network device, preconfigured, or predefined. The channel interference level may alternatively be determined based on a measured reference signal received power (RSRP) and/or a measured received signal strength indicator (RSSI). Specifically, an RSRP threshold and/or an RSSI threshold are/is set. Optionally, the RSRP threshold and/or the RSSI threshold may be related to the priority. The RSRP threshold and/or the RSSI threshold may be configured by the network device, preconfigured, or predefined. When the measured RSRP is greater than the RSRP threshold and/or the measured RSSI is greater than the RSSI threshold, it is determined that the channel interference level is high, and the second terminal activates the first time window. When the channel interference level is high, and the first terminal determines, by sensing the time-frequency resource set, the time-frequency resource for sending the SL information in the active first time window, the resource collision probability is increased. The time-frequency resource for sending the SL information in the active first time window is selected based on the indication of the second terminal, so that the benefit of central scheduling of the second terminal is obtained, and the resource collision is reduced. A size of the basic allocated time-frequency resource is a minimum time-frequency resource, for example, a slot and a subchannel, used by a terminal to send a PSSCH. The size of the basic allocated time-frequency resource may alternatively be predefined in the standard. The quantity for determining whether there are abundant basic allocated time-frequency resources may be determined based on a threshold of the basic allocated time-frequency resource. Optionally, the threshold of the basic allocated time-frequency resource may be related to the priority. The threshold of the basic allocated time-frequency resource may be configured by the network device, preconfigured, or predefined. When a basic allocated time-frequency resource actually obtained by the second terminal is greater than the threshold of the basic allocated time-frequency resource, it is determined that there are abundant basic allocated time-frequency resources, the sec-ond terminal can provide a resource indication for the first terminal, and the second terminal activates the first time window.

In some examples, the second terminal sends the first control information to the first terminal via non-physical layer signaling such as PC5-RRC, an SL MAC CE, RRC, a MAC CE, or preconfiguration.

For example, the second terminal sends the first control information to the first terminal in a slot (f-g). For example, the first control information is a GTNS (GoToNon-Sensing (GTN) signal), and the GTNS includes activation or deactivation information, for activating or deactivating a first time window whose start position is a slot f. For example, the GTNS is carried by using one bit. For example, if a GTNS value is "1", it indicates activation; or if a GTNS value is "o", it indicates deactivation. For another example, if a GTNS value is "i", it indicates activation; or if the GTNS is not sent, it indicates deactivation.

In some examples, the first control information is carried on a physical channel, for example, a PSFCH. A PSFCH resource for carrying the first control information and a PSFCH resource for performing HARQ feedback including ACK or NACK information are orthogonal, that is, do not overlap. Optionally, the PSFCH resource for carrying the first control information is configured by the network device, preconfigured, or predefined. For example, one PSFCH resource includes one symbol and one physical resource block (PRB), and is for carrying the first control information. Optionally, the PSFCH resource may further include a code domain resource. For example, if the first control information is sent via a sequence, different code domain resources may be represented by using different cyclic shifts of the sequence.

In an example, the slot (f-g) is before the slot f, and is a slot that is closest to the slot f in terms of time and in which there is a PSFCH resource. In another example, the slot (f-g) is before the slot f, and is a slot that is closest to the slot f in terms of time and that satisfies a processing delay of the first terminal. The processing delay is a delay needed by the first terminal to receive and process the PSFCH. f<g, and f and g are both positive integers. A value of g may be carried in the first control information, configured by the network device, provided by time-frequency resource set configuration information, preconfigured, or predefined.

Figure 9:
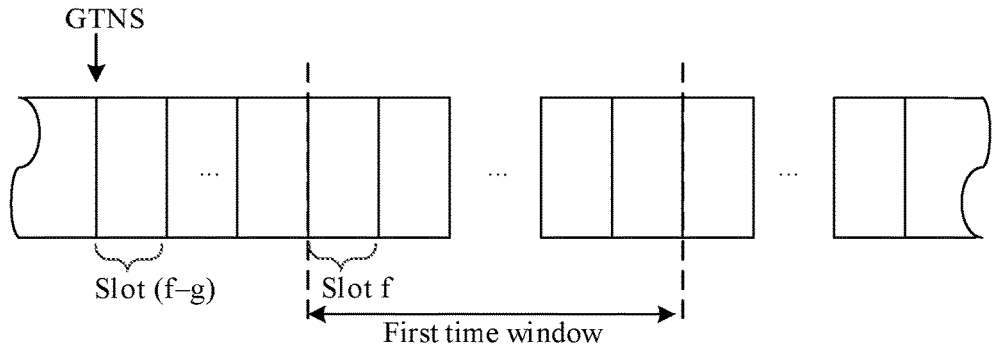
FIG. 9 is a schematic diagram 4 of a communication method according to an embodiment of this application.

For example, as shown in FIG. 9, the second terminal sends the GTNS in the slot (f-g), to indicate to activate the first time window whose start position is the slot f.

S703: The first terminal obtains the active first time window based on the indication of the second terminal.

In an implementation, the first terminal obtains the at least one first time window in the time-frequency resource set. The at least one first time window may be configured by the network device, preconfigured, predefined, or indicated by the second terminal. Optionally, the configuration information of the at least one first time window remains unchanged in a period of time. The first terminal receives the first control information from the second terminal, where the first control information indicates to activate or deactivate one of the at least one first time window.

In some examples, the first terminal receives the non-physical layer signaling such as the PC5-RRC, the SL MAC CE, the RRC, the MAC CE, or the preconfiguration, to obtain the first control information.

For example, the first terminal receives the first control information in the slot (f-g). For example, the first control information is the GTNS (GoToNon-Sensing (GTN) signal), and the GTNS includes the activation or deactivation information, for activating or deactivating the first time window whose start position is the slot f. If the first control information includes the activation information, the first terminal determines to activate the first time window whose start position is the slot f. That is, the first time window whose start position is the slot f is the active first time window. In the time window, the first terminal stops determining, by sensing the time-frequency resource set, the time-frequency resource for sending the sidelink communication information in the active first time window. If the first control information includes the deactivation information, the first terminal determines to deactivate the first time window whose start position is the slot f. That is, the first time window whose start position is the slot f is a deactivated first time window. In the time window, the first terminal determines, by sensing the time-frequency resource set, a time-frequency resource for sending the sidelink communication information in the deactivated first time window.

S704: The first terminal determines to-be-sent first SL information.

S705: The first terminal sends a resource allocation request to the second terminal.

S706: The second terminal determines a time-frequency resource used by the first terminal to send the first SL information.

S707: The second terminal sends first indication information to the first terminal in the active first time window.

S708: The first terminal receives the first indication information, and sends the first SL information on at least one time-frequency resource indicated by the first indication information.

For specific steps of S704 to S708, refer to S602 to S606. Details are not described herein again.

According to the communication method provided in this embodiment of this application, the second terminal configures the active first time window for the first terminal. In a specified first time window (a coordination window), the first terminal selects, based on the indication of the second terminal, the time-frequency resource for sending the SL information in the active first time window, instead of determining, by sensing the time-frequency resource set, the time-frequency resource for sending the SL information in the active first time window. In this way, energy consumption of sensing can be reduced, and a probability of a conflict between resources for sending the SL information is also reduced.

Figure 10:
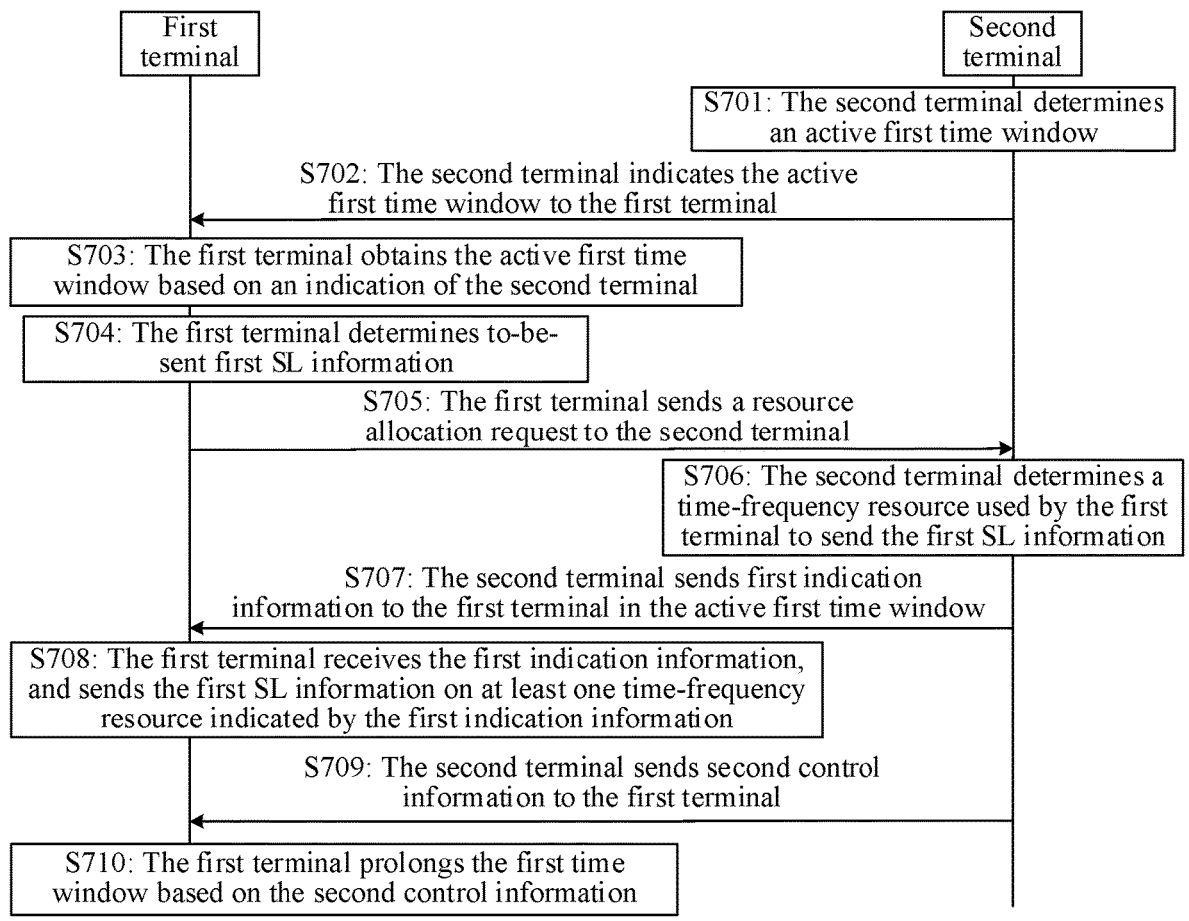
FIG. 10 is a schematic flowchart 3 a communication method according to an embodiment of this application.

Optionally, in some embodiments, the second terminal indicates to prolong the first time window. With reference to FIG. 8, as shown in FIG. 10, the communication method provided in this embodiment of this application may further include S709 and S710.

S709: The second terminal sends second control information to the first terminal.

The second control information indicates to prolong duration of the first time window. For example, duration by which the first time window is prolonged is the duration of the first time window. For another example, duration by which the first time window is prolonged is duration of two first time windows. For another example, duration by which the first time window is prolonged is duration of half of the first time window. The second terminal may determine, based on a result of sensing the time-frequency resource set, the duration by which the first time window is prolonged.

In an implementation, an end moment of the first time window is a start moment of a prolonged time window. Duration of the prolonged time window is equal to the duration of the first time window, and a frequency domain resource configuration of the prolonged time window is the same as a frequency domain resource configuration of the first time window.

In an example, the second control information is carried by using one bit. For example, if a value of the second control information is "1", it indicates that the coordination window is immediately prolonged at the end moment of the collaboration window, duration by which the coordination window is prolonged is the duration of the coordination window, and the frequency domain resource configuration of the prolonged time window is the same as the frequency domain resource configuration of the coordination window. If a value of the second control information is "0", it indicates that duration by which the coordination window is prolonged is 0. That is, the collaboration window is not prolonged.

In an implementation, the second control information is carried on a physical channel, for example, a PSFCH. That is, the second terminal sends the second control information to the first terminal through the PSFCH. In an example, a PSFCH resource for carrying the second control information and the PSFCH resource for performing HARQ feedback including ACK or NACK information are orthogonal, that is, do not overlap. Optionally, the PSFCH resource for carrying the second control information is configured by the network device, preconfigured, or predefined. For example, one PSFCH resource includes one symbol and one PRB, and is for carrying the second control information. Optionally, the PSFCH resource may further include a code domain resource. For example, if the second control information is sent via a sequence, different code domain resources may be represented by using different cyclic shifts of the sequence.

Figure 11:
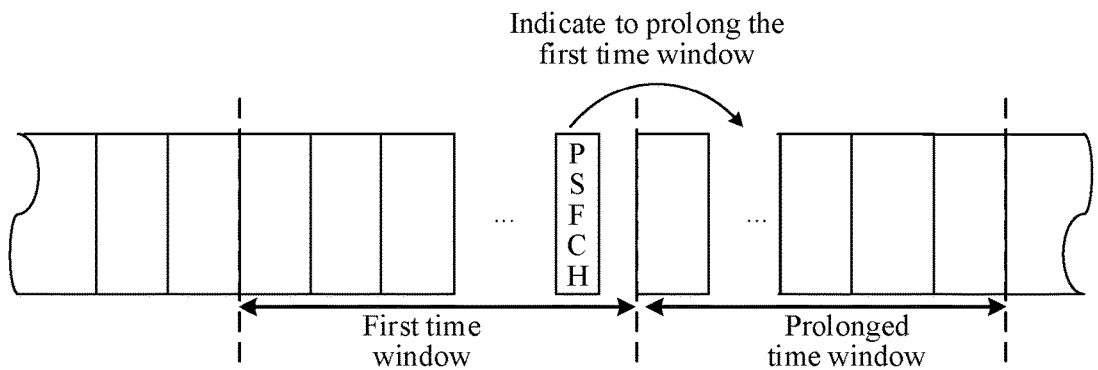
FIG. 11 is a schematic diagram 5 of a communication method according to an embodiment of this application.

In an example, the second control information is carried on the last PSFCH resource in the first time window in terms of time. For example, as shown in FIG. 11, the second control information carried on the last PSFCH resource in the first time window in terms of time indicates to prolong the first time window. The first time window is immediately prolonged at the end moment of the first time window, and duration by which the first time window is prolonged is the duration of the first time window.

S710: The first terminal prolongs the first time window based on the second control information.

The first terminal receives the second control information, and prolongs the first time window based on the second control information. For example, if the value of the second control information is "1", the first terminal immediately prolongs the first time window at the end moment of the first time window, the duration by which the first time window is prolonged is the duration of the first time window, and the frequency domain resource configuration of a prolonged time window is the same as the frequency domain resource configuration of the first time window.

In this way, the second terminal does not need to reconfigure a first time window for the first terminal, and the first terminal only needs to prolong the current first time window by a period of time based on a configuration of the current first time window. A procedure of configuring the first time window is faster and more convenient, and resource configuration efficiency is improved.

Figure 12:
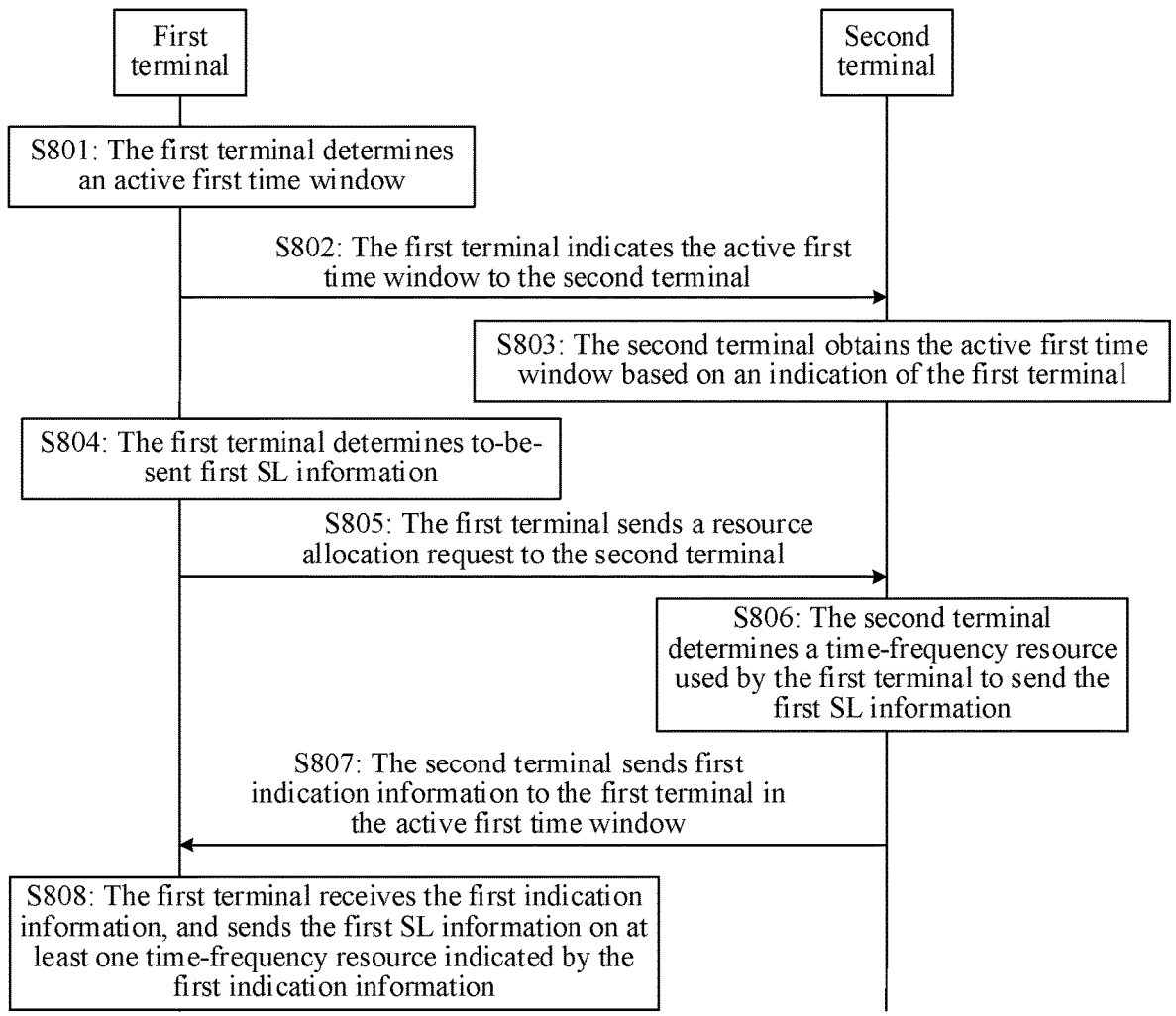
FIG. 12 is a schematic flowchart 4 of a communication method according to an embodiment of this application.

In some embodiments, the first terminal determines a time period of the first time window based on a requirement of the first terminal. As shown in FIG. 12, a communication method provided in an embodiment of this application includes the following steps.

S801: A first terminal determines an active first time window.

A network device or a terminal configures one or more slots in time domain in a time-frequency resource set as one coordination window (a first time window), or the one or more slots in time domain in the time-frequency resource set are preconfigured as one first time window. Specifically, at least one first time window may be configured in the time-frequency resource set. The first terminal determines that one first time window is to be activated. In the active first time window, the first terminal stops determining, by sensing the time-frequency resource set, a time-frequency resource for sending sidelink communication information.

For example, the first terminal determines, based on an energy saving requirement, a first time window in which determining, by sensing the time-frequency resource set, the time-frequency resource for sending the sidelink communication information is stopped. Optionally, the first terminal may further determine the first time window based on a channel status (including a channel congestion status, a channel interference level, and/or the like). Specifically, a CBR threshold and/or a CR threshold are/is set. Optionally, the CBR threshold and/or the CR threshold may be related to a priority. The CBR threshold and/or the CR threshold may be configured by the network device, preconfigured, or predefined. When a CBR measured by the first terminal is greater than the CBR threshold and/or a CR measured by the first terminal is greater than the CR threshold, it is determined that channel congestion occurs, and the first terminal determines the first time window. For example, a higher channel congestion degree, namely, a higher measured value of the CBR or the CR, indicates a greater length of the first time window. When the channel congestion occurs, and the first terminal determines, by sensing the time-frequency resource set, the time-frequency resource for sending the SL information in the active first time window, a resource collision probability is increased. The time-frequency resource for sending the SL information in the active first time window is selected based on an indication of a second terminal, so that benefit of central scheduling of the second terminal is obtained, and resource collision is reduced. The channel interference level may be determined based on a NACK received by the first terminal or determining of discontinuous transmission (DTX). A condition for determining the DTX is that HARQ feedback information is not correctly received (where an ACK or a NACK is not correctly received) on a resource on which a HARQ feedback should be received. Specifically, when a quantity of NACKs continuously received by the first terminal in a period of time exceeds a first NACK threshold, a total quantity of NACKs received by the first terminal in a period of time exceeds a second NACK threshold, and/or the DTX determined by the first terminal in a period of time exceeds a DTX threshold, it is determined that the channel interference level is high, and the first terminal determines the first time window. For example, a higher channel interference level, namely, a larger quantity of NACKs and/or a larger quantity of times of the determined DTX, indicates the greater length of the first time window. Optionally, the first NACK threshold, the second NACK threshold, and/or the DTX threshold may be related to the priority. The first NACK threshold, the second NACK threshold, and/or the DTX threshold may be configured by the network device, preconfigured, or predefined. The channel interference level may alternatively be determined based on a measured reference signal received power (RSRP) and/or a measured received signal strength indicator (RSSI). Specifically, an RSRP threshold and/or an RSSI threshold are/is set. Optionally, the RSRP threshold and/or the RSSI threshold may be related to the priority. The RSRP threshold and/or the RSSI threshold may be configured by the network device, preconfigured, or predefined. When an RSRP measured by the first terminal is greater than the RSRP threshold and/or an RSSI measured by the first terminal is greater than the RSSI threshold, it is determined that the channel interference level is high, and the first terminal determines the first time window. For example, the higher channel interference level, namely, a higher measured value of the RSRP or the RSSI, indicates the greater length of the first time window. When the channel interference level is high, and the first terminal determines, by sensing the time-frequency resource set, the time-frequency resource for sending the SL information in the active first time window, the resource collision probability is increased. The time-frequency resource for sending the SL information in the active first time window is selected based on the indication of the second terminal, so that the benefit of central scheduling of the second terminal is obtained, and the resource collision is reduced.

S802: The first terminal indicates the active first time window to the second terminal.

In an implementation, the second terminal obtains the at least one first time window in the time-frequency resource set. The at least one first time window may be configured by the network device, preconfigured, predefined, or indicated by the first terminal. Optionally, configuration information of the at least one first time window remains unchanged in a period of time. The first terminal dynamically activates or deactivates one of the at least one first time window. If the first time window is activated, the first time window is the active first time window, the first terminal stops determining, by sensing the time-frequency resource set, the time-frequency resource for sending the sidelink communication information in the active first time window, but determines, in the time-frequency resource set based on the indication of the second terminal, the time-frequency resource for sending the SL information in the active first time window. If the first time window is deactivated, the first time window is a deactivated first time window, and the first terminal determines, by sensing the time-frequency resource set, a time-frequency resource for sending the sidelink communication information in the deactivated first time window, instead of determining, in the time-frequency resource set based on the indication of the second terminal, the time-frequency resource for sending the SL information in the deactivated first time window. For example, the first terminal sends first control information to the second terminal, where the first control information includes activation indication information, indicating to activate one of the at least one first time window; and the first control information may further include deactivation indication information, indicating to deactivate one of the at least one first time window.

In some examples, the first terminal sends the first control information to the second terminal via non-physical layer signaling such as PC5-RRC, an SL MAC CE, RRC, a MAC CE, or preconfiguration.

For example, the first terminal sends the first control information to the second terminal in a slot (f-w). For example, the first control information is a GTNRS (GoTo-Non-sensing-request (GTN) signal), and the GTNRS includes activation or deactivation information, for activating or deactivating a first time window whose start position is a slot f. For example, the GTNRS is carried by using one bit. For example, if a GTNRS value is "i", it indicates activation; or if a GTNRS value is "0", it indicates deactivation. For another example, if a GTNRS value is "1", it indicates activation; or if the GTNRS is not sent, it indicates deactivation.

In some examples, the first control information is carried on a physical channel, for example, a PSFCH. A PSFCH resource for carrying the first control information and a PSFCH resource for performing HARQ feedback including ACK or NACK information are orthogonal, that is, do not overlap. Optionally, the PSFCH resource for carrying the first control information is configured by the network device, preconfigured, or predefined. For example, one PSFCH resource includes one symbol and one PRB, and is for carrying the first control information. Optionally, the PSFCH resource may further include a code domain resource. For example, if the first control information is sent via a sequence, different code domain resources may be represented by using different cyclic shifts of the sequence.

In an example, the slot (f-w) is before a slot (f-q), and is a slot that is closest to the slot (f-q) in terms of time and in which there is a PSFCH resource. Duration q is time determined by sensing the time-frequency resource set by the second terminal, needed for information exchange between the first terminal and the second terminal and for the second terminal to provide the first terminal with a time-frequency resource and allocate a resource used by the first terminal to transmit first SL information, and in the first time window of the first terminal, where f<q<w, and f, q, and w are all positive integers. Alternatively, duration q is time obtained by the second terminal from the network device or another terminal, needed for information exchange between the first terminal and the second terminal and for the second terminal to provide the first terminal with a time-frequency resource and allocate a resource used by the first terminal to transmit first SL information, and in the first time window. For example, a value of q is duration of one sensing window of the second terminal. In another example, the slot (f-w) is before a slot (f-q), and duration q further includes a delay needed by the second terminal to receive and process a PSFCH.

Figure 13:
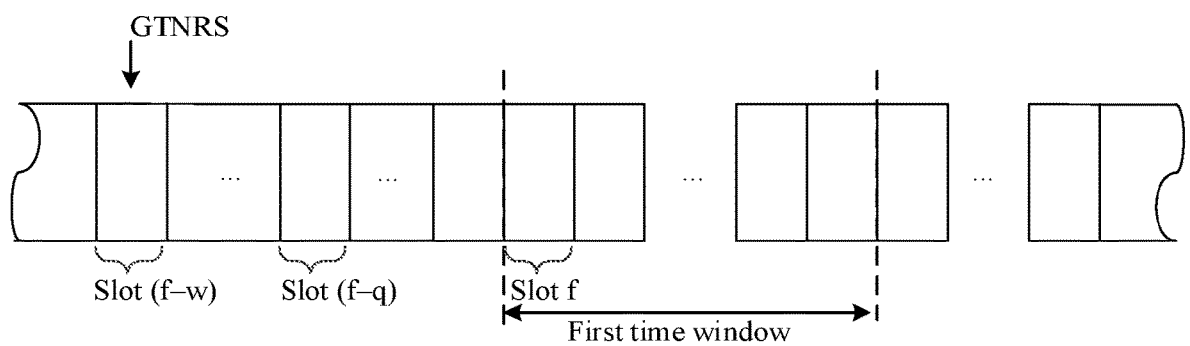
FIG. 13 is a schematic diagram 6 of a communication method according to an embodiment of this application.

For example, as shown in FIG. 13, the first terminal sends the GTNRS in the slot (f-w) before the slot (f-q), to indicate to activate the first time window whose start position is the slot f.

S803: The second terminal obtains the active first time window based on an indication of the first terminal.

In an implementation, the second terminal obtains the at least one first time window in the time-frequency resource set. The at least one first time window may be configured by the network device, preconfigured, predefined, or indicated by the first terminal. Optionally, configuration information of the at least one first time window remains unchanged in a period of time. The second terminal receives the first control information from the first terminal, where the first control information indicates to activate or deactivate one of the at least one first time window.

In some examples, the second terminal receives non-physical layer signaling such as PC5-RRC, an SL MAC CE, RRC, a MAC CE, or preconfiguration, to obtain third control information.

For example, the second terminal receives the first control information in the slot (f-w). For example, the first control information is the GTNRS, and the GTNRS includes the activation or deactivation information, for activating or deactivating the first time window whose start position is the slot f. If the first control information includes the activation information, the second terminal determines to activate the first time window whose start position is the slot f. That is, the first time window whose start position is the slot f is the active first time window. In the time window, the first terminal stops determining, by sensing the time-frequency resource set, the time-frequency resource for sending the sidelink communication information in the active first time window. If the first control information includes the deactivation information, the second terminal determines to deactivate the first time window whose start position is the slot f. That is, the first time window whose start position is the slot f is a deactivated first time window. In the time window, the first terminal determines, by sensing the time-frequency resource set, a time-frequency resource for sending the sidelink communication information in the deactivated first time window.

S804: The first terminal determines the to-be-sent first SL information.

S805: The first terminal sends a resource allocation request to the second terminal.

S806: The second terminal determines a time-frequency resource used by the first terminal to send the first SL information.

S807: The second terminal sends first indication information to the first terminal in the active first time window.

S808: The first terminal receives the first indication information, and sends the first SL information on at least one time-frequency resource indicated by the first indication information.

For specific steps of S804 to S808, refer to S602 to S606. Details are not described herein again.

According to the communication method provided in this embodiment of this application, the first terminal configures the active first time window based on a requirement of the first terminal. In a specified first time window (a coordination window), the first terminal selects, based on the indication of the second terminal, the time-frequency resource for sending the SL information in the active first time window, instead of determining, by sensing the time-frequency resource set, the time-frequency resource for sending the SL information in the active first time window. In this way, energy consumption of sensing can be reduced, and a probability of a conflict between resources for sending the SL information is also reduced.

Figure 14:
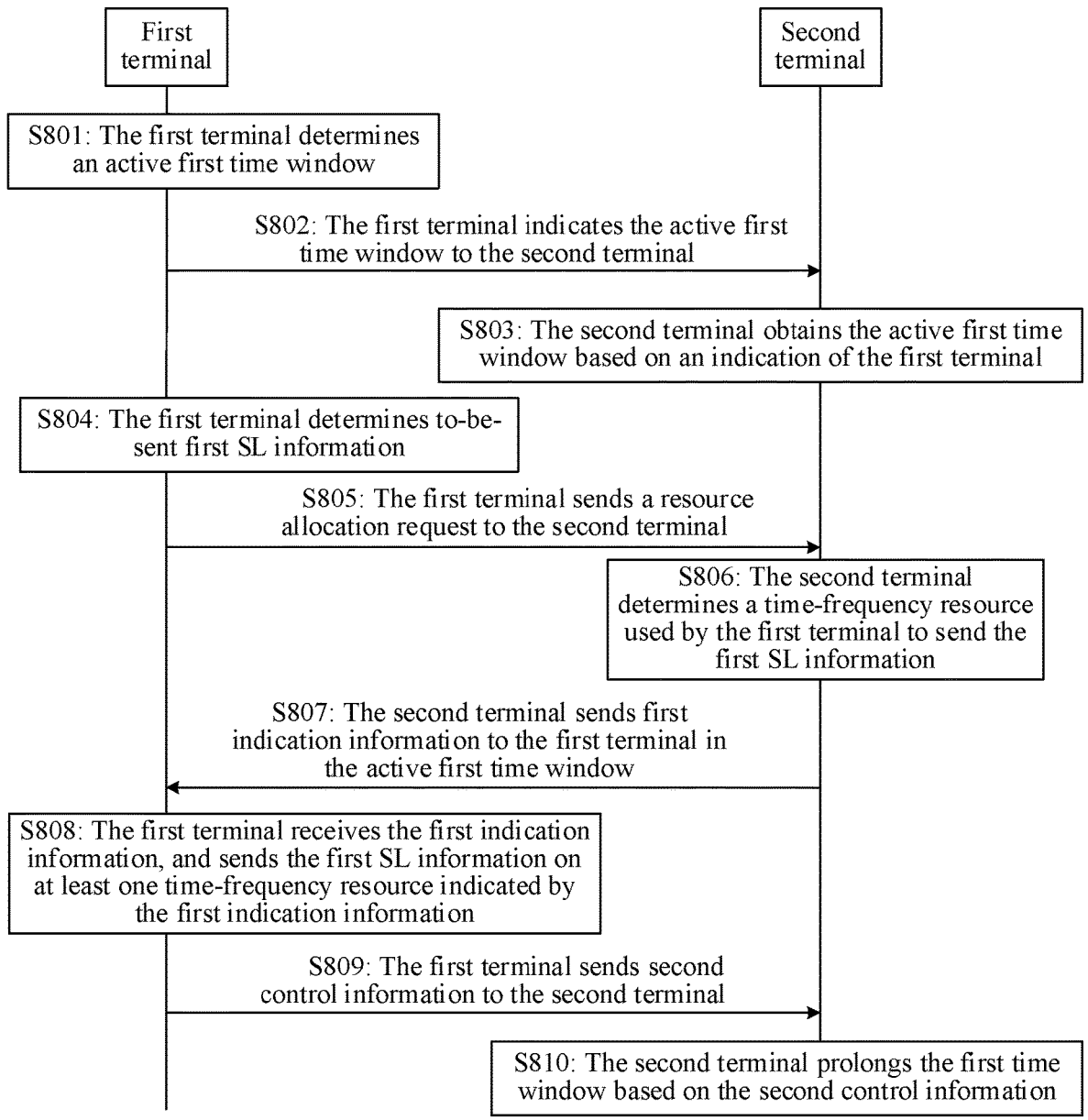
FIG. 14 is a schematic flowchart 5 of a communication method according to an embodiment of this application.

Optionally, in some embodiments, the first terminal indicates to prolong the first time window. With reference to FIG. 12, as shown in FIG. 14, the communication method provided in this embodiment of this application may further include S809 and S810.

S809: The first terminal sends second control information to the second terminal.

The second control information indicates to prolong duration of the first time window. For example, duration by which the first time window is prolonged is the duration of the first time window. For another example, duration by which the first time window is prolonged is duration of two first time windows. For another example, duration by which the first time window is prolonged is duration of half of the first time window. The second terminal may determine, based on a result of sensing the time-frequency resource set, the duration by which the first time window is prolonged.

In an implementation, an end moment of the first time window is a start moment of a prolonged time window. Duration of the prolonged time window is equal to the duration of the first time window, and a frequency domain resource configuration of the prolonged time window is the same as a frequency domain resource configuration of the first time window.

In an example, the second control information is carried by using one bit. For example, if a value of the second control information is "i", it indicates that the coordination window is immediately prolonged at the end moment of the collaboration window, duration by which the coordination window is prolonged is the duration of the coordination window, and the frequency domain resource configuration of the prolonged time window is the same as the frequency domain resource configuration of the coordination window. If a value of the second control information is "0", it indicates that duration by which the coordination window is prolonged is 0. That is, the collaboration window is not prolonged.

In an implementation, the second control information is carried on a physical channel, for example, a PSFCH. That is, the first terminal sends the second control information to the second terminal through the PSFCH. In an example, a PSFCH resource for carrying the second control information and the PSFCH resource for performing HARQ feedback including ACK or NACK information are orthogonal, that is, do not overlap. Optionally, the PSFCH resource for carrying the second control information is configured by the network device, preconfigured, or predefined. For example, one PSFCH resource includes one symbol and one PRB, and is for carrying the second control information. Optionally, the PSFCH resource may further include a code domain resource. For example, if the second control information is sent via a sequence, different code domain resources may be represented by using different cyclic shifts of the sequence.

Figure 15:
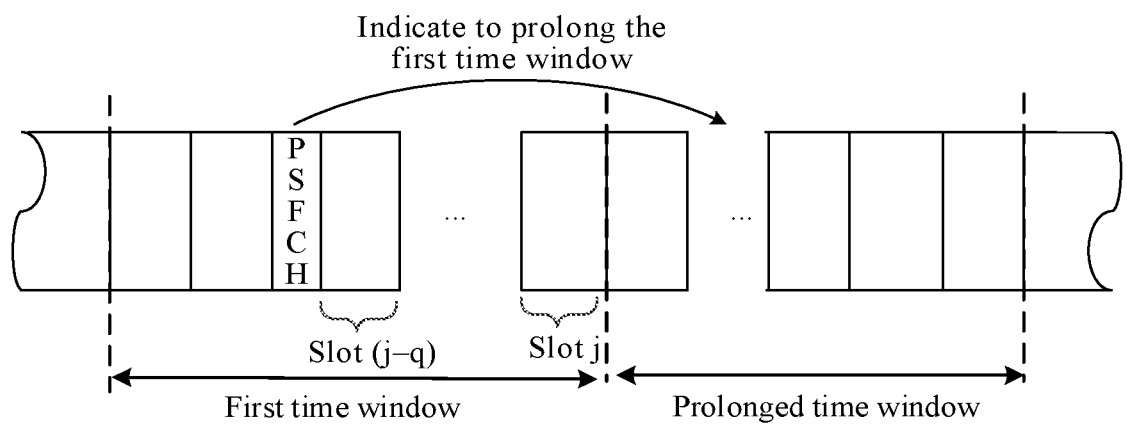
FIG. 15 is a schematic diagram 7 of a communication method according to an embodiment of this application.

In an example, the second control information is carried in the last slot that is closest to a slot (j-q) in the first time window in terms of time and in which there is a PSFCH resource. A slot j is the last slot in the first time window, and the duration q is the time determined by sensing the time-frequency resource set by the second terminal, needed for the information exchange between the first terminal and the second terminal and for the second terminal to provide the first terminal with the time-frequency resource and allocate the resource used by the first terminal to transmit the first SL information, and in the first time window of the first terminal. For example, as shown in FIG. 15, the second control information carried on the last PSFCH resource that is closest to the slot (j-q) in the first time window in terms of time indicates to prolong the first time window. The first time window is immediately prolonged at the end moment of the first time window, and duration by which the first time window is prolonged is the duration of the first time window.

S810: The second terminal prolongs the first time window based on the second control information.

The second terminal receives the second control information, and prolongs the first time window based on the second control information. For example, if the value of the second control information is "1", the second terminal immediately prolongs the first time window at the end moment of the first time window, the duration by which the first time window is prolonged is the duration of the first time window, and the frequency domain resource configuration of a prolonged time window is the same as the frequency domain resource configuration of the first time window.

In this way, the first terminal does not need to reconfigure a first time window for the second terminal, and the second terminal only needs to prolong the current first time window by a period of time based on a configuration of the current first time window. A procedure of configuring the first time window is faster and more convenient, and resource configuration efficiency is improved.

An embodiment of this application further provides a communication method. A second terminal determines a first time window, and a first terminal obtains the first time window based on an indication of the second terminal. That is, the second terminal determines a time period in which the first terminal stops determining, by sensing a time-frequency resource set, a time-frequency resource for sending sidelink communication information. This can reduce a probability of a conflict between time-frequency resources for sending sidelink communication information.

Figure 16:
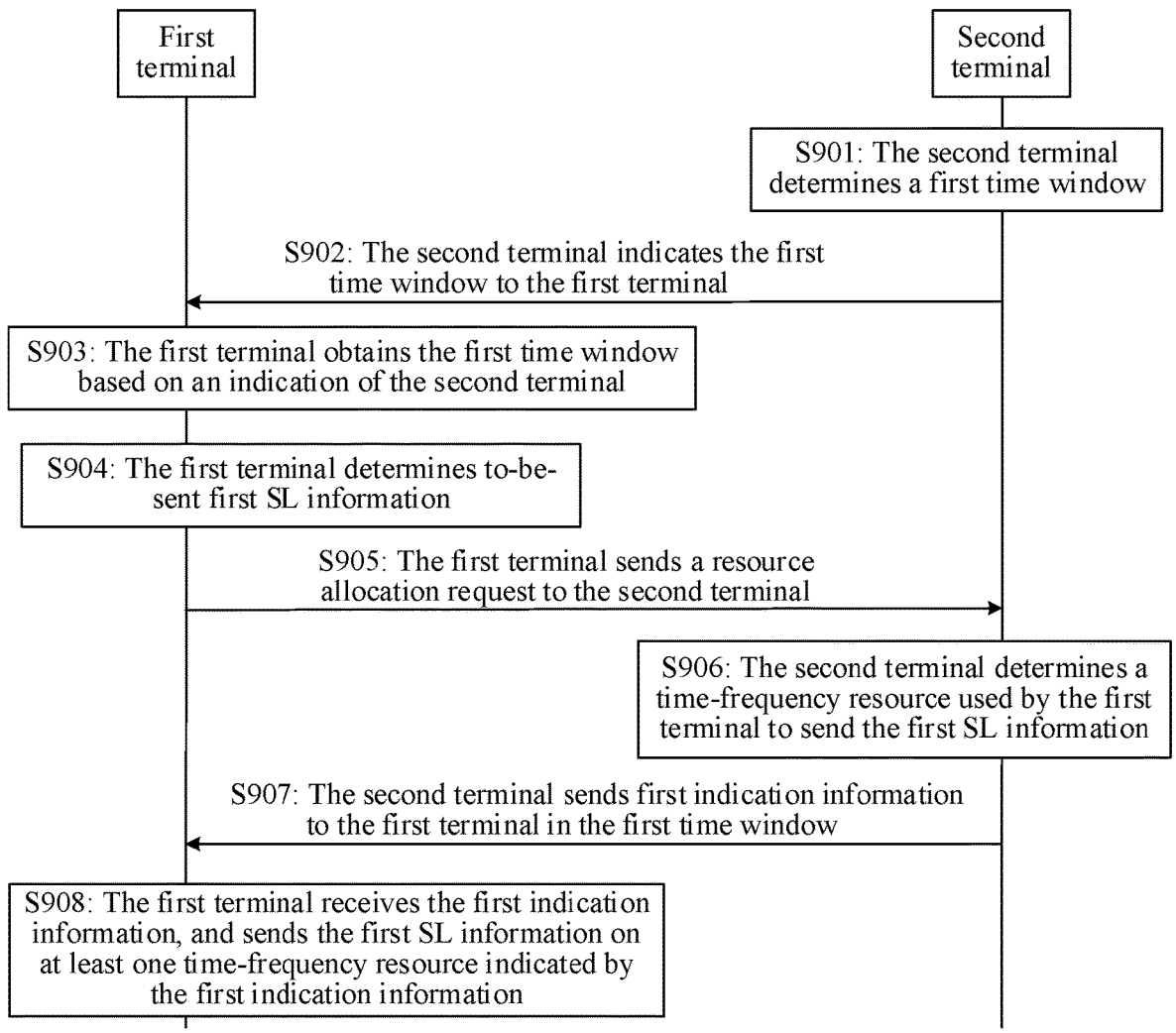
FIG. 16 is a schematic flowchart 6 of a communication method according to an embodiment of this application.

As shown in FIG. 16, the communication method provided in this embodiment of this application may include the following steps.

S901: The second terminal determines the first time window.

In some examples, the second terminal determines the first time window in which the first terminal stops determining, by sensing the time-frequency resource set, the time-frequency resource for sending the sidelink communication information. For example, if the second terminal can determine a time-frequency resource set reservation usage status of another terminal in a first time period through sensing, or the second terminal can obtain a time-frequency resource in the time-frequency resource set in a first time period through scheduling or resource configuration of a network device, so that the first time period may be determined as the first time window. Optionally, the second terminal may further determine the first time window based on a channel status (including a channel congestion status, a channel interference level, and/or the like). Specifically, a CBR threshold and/or a CR threshold are/is set. Optionally, the CBR threshold and/or the CR threshold may be related to a priority. The CBR threshold and/or the CR threshold may be configured by the network device, preconfigured, or predefined. When a CBR measured by the second terminal is greater than the CBR threshold and/or a CR measured by the second terminal is greater than the CR threshold, it is determined that channel congestion occurs, and the second terminal determines the first time window. For example, a higher channel congestion degree, namely, a higher measured value of the CBR or the CR, indicates a greater length of the first time window. When the channel congestion occurs, and the second terminal determines, by sensing the time-frequency resource set, the time-frequency resource for sending the SL information in the active first time window, a resource collision probability is increased. The time-frequency resource for sending the SL information in the active first time window is selected based on an indication of the second terminal, so that benefit of central scheduling of the second terminal is obtained, and resource collision is reduced. The channel interference level may be determined based on a NACK received by the second terminal or determining of discontinuous transmission (DTX). A condition for determining the DTX is that HARQ feedback information is not correctly received (where an ACK or a NACK is not correctly received) on a resource on which a HARQ feedback should be received. Specifically, when a quantity of NACKs continuously received by the first terminal in a period of time exceeds a first NACK threshold, a total quantity of NACKs received by the first terminal in a period of time exceeds a second NACK threshold, and/or the DTX determined by the first terminal in a period of time exceeds a DTX threshold, it is determined that the channel interference level is high, and the second terminal determines the first time window. For example, a higher channel interference level, namely, a larger quantity of NACKs and/or a larger quantity of times of the determined DTX, indicates the greater length of the first time window. Optionally, the first NACK threshold, the second NACK threshold, and/or the DTX threshold may be related to the priority. The first NACK threshold, the second NACK threshold, and/or the DTX threshold may be configured by the network device, preconfigured, or predefined. The channel interference level may alternatively be determined based on a measured reference signal received power (RSRP) and/or a measured received signal strength indicator (RSSI). Specifically, an RSRP threshold and/or an RSSI threshold are/is set. Optionally, the RSRP threshold and/or the RSSI threshold may be related to the priority. The RSRP threshold and/or the RSSI threshold may be configured by the network device, preconfigured, or predefined. When an RSRP measured by the second terminal is greater than the RSRP threshold and/or an RSSI measured by the second terminal is greater than the RSSI threshold, it is determined that the channel interference level is high, and the second terminal determines the first time window. For example, the higher channel interference level, namely, a higher measured value of the RSRP or the RSSI, indicates the greater length of the first time window. When the channel interference level is high, and the first terminal determines, by sensing the time-frequency resource set, the time-frequency resource for sending the SL information in the active first time window, the resource collision probability is increased. The time-frequency resource for sending the SL information in the active first time window is selected based on the indication of the second terminal, so that the benefit of central scheduling of the second terminal is obtained, and the resource collision is reduced.

In the first time window, the first terminal stops determining, by sensing the time-frequency resource set, the time-frequency resource for sending the SL information, but determines, in the time-frequency resource set based on an indication of an auxiliary terminal (the second terminal), the time-frequency resource for sending the SL information.

An inter-terminal coordination connection is established between the first terminal and the second terminal. In this case, the first terminal and the second terminal exchange coordination information via signaling. For example, the signaling includes PC5-RRC, an SL MAC CE, or SCI, or may include information that is provided by an APP layer of the first terminal for a MAC layer and a PHY layer and that is for establishing the connection between the first terminal and the second terminal, further includes identification information of the first terminal and the second terminal, and is used by the first terminal and the second terminal to identify each other or data of each other. The first terminal and the second terminal belong to one coordination peer end or one coordination group, or belong to one group of coordination data/services.

In some embodiments, the first time window includes a first sub-time window. In the first sub-time window, the first terminal stops sensing the time-frequency resource set, and stops determining, by sensing the time-frequency resource set, a time-frequency resource for sending the SL information in the first sub-time window, but determines, in the time-frequency resource set based on the indication of the second terminal, the time-frequency resource for sending the SL information in the first time window.

In some embodiments, the first time window further includes a second sub-time window. In the second sub-time window, the first terminal senses the time-frequency resource set, but does not determine, by sensing the time-frequency resource set, a time-frequency resource for sending the SL information in the second sub-time window, but determines, in the time-frequency resource set based on the indication of the second terminal, the time-frequency resource for sending the SL information in the second sub-time window. In this way, after the first time window ends, a time-frequency resource after the first time window ends may be selected based on a result of sensing the time-frequency resource set in the second sub-time window, to send the SL information. This avoids a case in which a resource collision probability is increased and transmission reliability is reduced for the following reason: Resource reservation information after the first time window ends cannot be obtained after the first time window ends because the time-frequency resource set is not sensed, and the time-frequency resource for sending the SL information is selected through random selection or based on a partial sensing result because the indication of the second terminal is not obtained.

S902: The second terminal indicates the first time window to the first terminal.

In an implementation, the second terminal sends time window indication information to the first terminal, where the time window indication information indicates the first time window. In some examples, the second terminal sends the time window indication information to the first terminal via physical layer signaling such as SCI or SFCI, a MAC CE, or PC5-RRC. The time window indication information includes at least one of first time window information, first sub-time window information, and second sub-time window information. Content of the first time window information, the first sub-time window information, and the second sub-time window information has been described above. Details are not described herein again.

For example, the second terminal sends the time window indication information to the first terminal in a slot (f-r), to indicate the first terminal to enter the first time window in the slot f, where r is an integer greater than or equal to 0. The time window indication information may further include an indication of a value of r, or a value of r is configured by the network device, preconfigured, or predefined.

S903: The first terminal obtains the first time window based on the indication of the second terminal.

In an implementation, the first terminal receives the time window indication information from the second terminal, and obtains the first time window based on the time window indication information. In some examples, the first terminal receives the physical layer signaling such as the SCI or the SFCI, the MAC CE, or the PC5-RRC, to obtain the time window indication information.

For example, if the first terminal receives the time window indication information in the slot (f-r), the first terminal determines to enter the first time window in the slot f, where r is an integer greater than or equal to 0. The time window indication information may further include the indication of the value of r, or the value of r is configured by the network device, preconfigured, or predefined.

S904: The first terminal determines to-be-sent first SL information.

For a specific step of S904, refer to S602. Details are not described herein again.

S905: The first terminal sends a resource allocation request to the second terminal.

The resource allocation request requests the second terminal to allocate a time-frequency resource used by the first terminal to send the first SL information.

S906: The second terminal determines the time-frequency resource used by the first terminal to send the first SL information.

For a specific step of S906, refer to S604. Details are not described herein again.

S907: The second terminal sends first indication information to the first terminal in the first time window.

The second terminal sends the first indication information to the first terminal in a first time-frequency unit in the first time window, where the first indication information indicates at least one time-frequency resource used by the first terminal to send the first SL information. In some examples, the at least one time-frequency resource is in the first time window in time domain. The first time-frequency unit may be a time-frequency resource set including one slot and one subchannel, or may be a time-frequency resource set including one or more slots and one or more subchannels.

For a method for obtaining the first time-frequency unit by the first terminal and the second terminal, refer to S605. Details are not described herein again.

S908: The first terminal receives the first indication information, and sends the first SL information on the at least one time-frequency resource indicated by the first indication information.

The first terminal receives the first indication information in the first time window, and sends the first SL information on the at least one time-frequency resource indicated by the first indication information.

According to the communication method provided in this embodiment of this application, the second terminal configures the first time window for the first terminal. In the first time window, the first terminal selects, based on the indication of the second terminal, the time-frequency resource for sending the SL information in the first time window, instead of determining, by sensing the time-frequency resource set, the time-frequency resource for sending the SL information in the first time window. In this way, energy consumption of sensing can be reduced, and a probability of a conflict between resources for sending the SL information is also reduced.

Optionally, in some embodiments, the second terminal may further indicate to prolong the first time window. For specific steps, refer to S709 and S710. Details are not described herein again.

Figure 17:
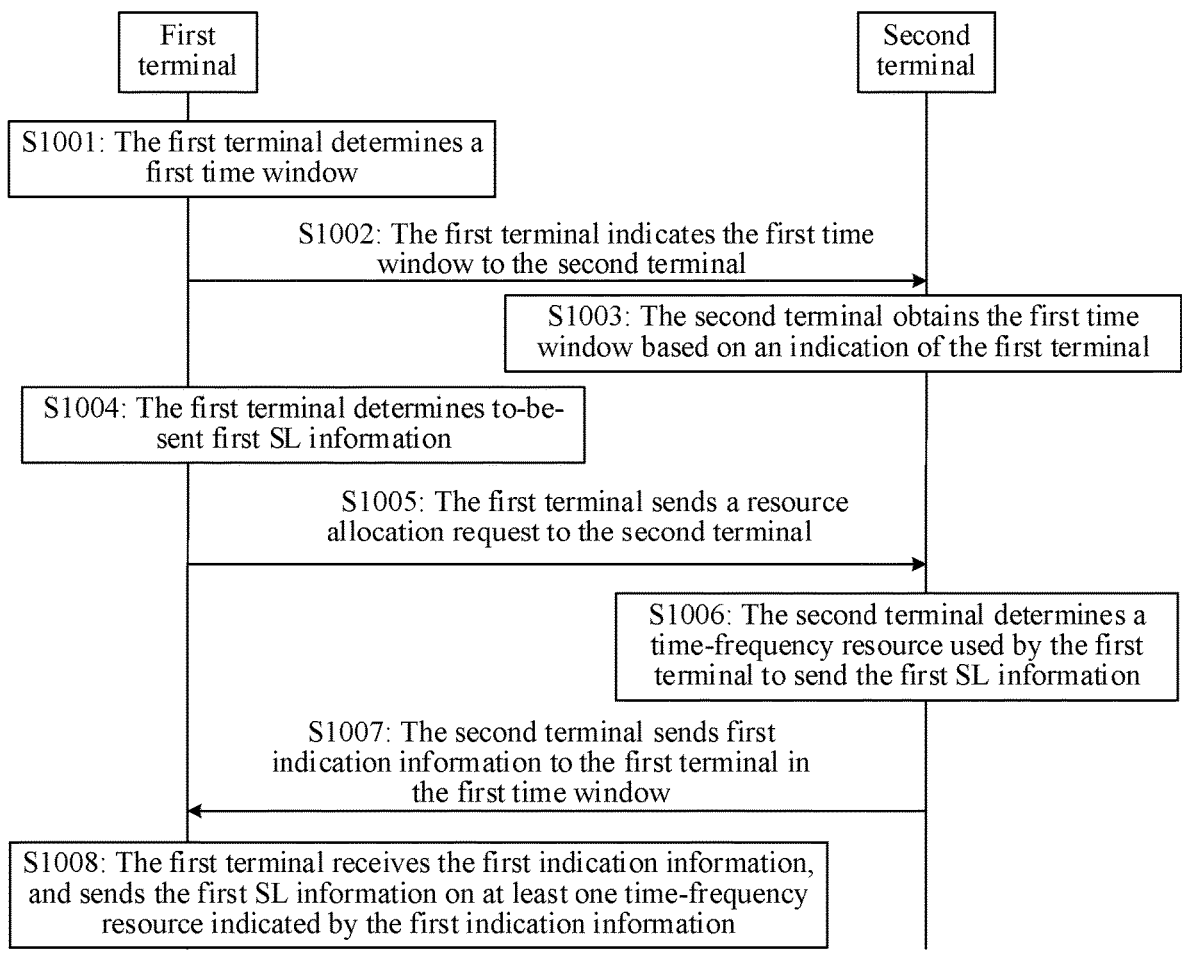
FIG. 17 is a schematic flowchart 7 of a communication method according to an embodiment of this application.

In some embodiments, the first terminal determines a time period of the first time window based on the requirement of the first terminal. As shown in FIG. 17, a communication method provided in an embodiment of this application includes the following steps.

S1001: A first terminal determines a first time window.

For example, the first terminal determines, based on an energy saving requirement, a first time window in which determining, by sensing a time-frequency resource set, a time-frequency resource for sending sidelink communication information is stopped. Optionally, the first terminal may further determine the first time window based on a channel status (including a channel congestion status, a channel interference level, and/or the like). Specifically, a CBR threshold and/or a CR threshold are/is set. Optionally, the CBR threshold and/or the CR threshold may be related to a priority. The CBR threshold and/or the CR threshold may be configured by a network device, preconfigured, or predefined. When a CBR measured by the first terminal is greater than the CBR threshold and/or a CR measured by the first terminal is greater than the CR threshold, it is determined that channel congestion occurs, and the first terminal determines the first time window. For example, a higher channel congestion degree, namely, a higher measured value of the CBR or the CR, indicates a greater length of the first time window. When the channel congestion occurs, and the first terminal determines, by sensing the time-frequency resource set, the time-frequency resource for sending the SL information in the active first time window, a resource collision probability is increased. The time-frequency resource for sending the SL information in the active first time window is selected based on an indication of a second terminal, so that benefit of central scheduling of the second terminal is obtained, and resource collision is reduced. The channel interference level may be determined based on a NACK received by the first terminal or determining of discontinuous transmission (DTX). A condition for determining the DTX is that HARQ feedback information is not correctly received (where an ACK or a NACK is not correctly received) on a resource on which a HARQ feedback should be received. Specifically, when a quantity of NACKs continuously received by the first terminal in a period of time exceeds a first NACK threshold, a total quantity of NACKs received by the first terminal in a period of time exceeds a second NACK threshold, and/or the DTX determined by the first terminal in a period of time exceeds a DTX threshold, it is determined that the channel interference level is high, and the first terminal determines the first time window. For example, a higher channel interference level, namely, a larger quantity of NACKs and/or a larger quantity of times of the determined DTX, indicates the greater length of the first time window. Optionally, the first NACK threshold, the second NACK threshold, and/or the DTX threshold may be related to the priority. The first NACK threshold, the second NACK threshold, and/or the DTX threshold may be configured by the network device, preconfigured, or predefined. The channel interference level may alternatively be determined based on a measured reference signal received power (RSRP) and/or a measured received signal strength indicator (RSSI). Specifically, an RSRP threshold and/or an RSSI threshold are/is set. Optionally, the RSRP threshold and/or the RSSI threshold may be related to the priority. The RSRP threshold and/or the RSSI threshold may be configured by the network device, preconfigured, or predefined. When an RSRP measured by the first terminal is greater than the RSRP threshold and/or an RSSI measured by the first terminal is greater than the RSSI threshold, it is determined that the channel interference level is high, and the first terminal determines the first time window. For example, the higher channel interference level, namely, a higher measured value of the RSRP or the RSSI, indicates the greater length of the first time window. When the channel interference level is high, and the first terminal determines, by sensing the time-frequency resource set, the time-frequency resource for sending the SL information in the active first time window, the resource collision probability is increased. The time-frequency resource for sending the SL information in the active first time window is selected based on the indication of the second terminal, so that the benefit of central scheduling of the second terminal is obtained, and the resource collision is reduced.

S1002: The first terminal indicates the first time window to the second terminal.

In an implementation, the first terminal sends time window indication information to the second terminal, where the time window indication information indicates the first time window. In some examples, the first terminal sends the time window indication information to the second terminal via physical layer signaling such as SCI or SFCI, a MAC CE, or PC5-RRC. The time window indication information includes at least one of first time window information, first sub-time window information, and second sub-time window information. Content of the first time window information, the first sub-time window information, and the second sub-time window information has been described above. Details are not described herein again.

For example, the first terminal sends the time window indication information to the second terminal in a slot (f-s), to indicate the first terminal and the second terminal to enter the first time window in a slot f, where s is an integer greater than or equal to 0. The time window indication information may further include an indication of a value of s, or a value of r is configured by the network device, preconfigured, or predefined. The value of s is time determined by sensing the time-frequency resource set by the second terminal, needed for information exchange between the first terminal and the second terminal and for the second terminal to provide the first terminal with a time-frequency resource and allocate a resource used by the first terminal to transmit first SL information in the first time window, and in the first time window of the first terminal. Alternatively, the value of s includes time obtained by the second terminal from the network device or another terminal, needed for information exchange between the first terminal and the second terminal and for the second terminal to provide the first terminal with a time-frequency resource and allocate a resource used by the first terminal to transmit first SL information in the first time window, and in the first time window.

S1003: The second terminal obtains the first time window based on an indication of the first terminal.

In an implementation, the second terminal receives the time window indication information from the first terminal, and obtains the first time window based on the time window indication information. In some examples, the second terminal receives the physical layer signaling such as the SCI or the SFCI, the MAC CE, or the PC5-RRC, to obtain the time window indication information.

For example, if the second terminal receives the time window indication information in the slot (f-s), the second terminal determines to enter the first time window in the slot f, where s is an integer greater than or equal to 0. The time window indication information may further include the indication of the value of s, or the value of s is configured by the network device, preconfigured, or predefined.

S1004: The first terminal determines the to-be-sent first SL information.

For a specific step of S1004, refer to S602. Details are not described herein again.

S1005: The first terminal sends a resource allocation request to the second terminal.

The resource allocation request requests the second terminal to allocate a time-frequency resource used by the first terminal to send the first SL information.

S1006: The second terminal determines the time-frequency resource used by the first terminal to send the first SL information.

For a specific step of S1006, refer to S604. Details are not described herein again.

S1007: The second terminal sends first indication information to the first terminal in the first time window.

For a specific step of S1007, refer to S907. Details are not described herein again.

S1008: The first terminal receives the first indication information, and sends the first SL information on at least one time-frequency resource indicated by the first indication information.

The first terminal receives the first indication information in the first time window, and sends the first SL information on the at least one time-frequency resource indicated by the first indication information.

According to the communication method provided in this embodiment of this application, the first terminal configures the first time window based on a requirement of the first terminal. In the first time window, the first terminal selects, based on the indication of the second terminal, the time-frequency resource for sending the SL information in the first time window, instead of determining, by sensing the time-frequency resource set, the time-frequency resource for sending the SL information in the first time window. In this way, energy consumption of sensing can be reduced, and a probability of a conflict between resources for sending the SL information is also reduced.

Optionally, in some embodiments, the first terminal may further indicate to prolong the first time window. For specific steps, refer to S809 and S810. Details are not described herein again.

Corresponding to the methods provided in the foregoing method embodiments, embodiments of this application further provide corresponding apparatuses, including corresponding modules configured to perform the foregoing embodiments. The module may be software, hardware, or a combination of the software and the hardware.

Figure 18:
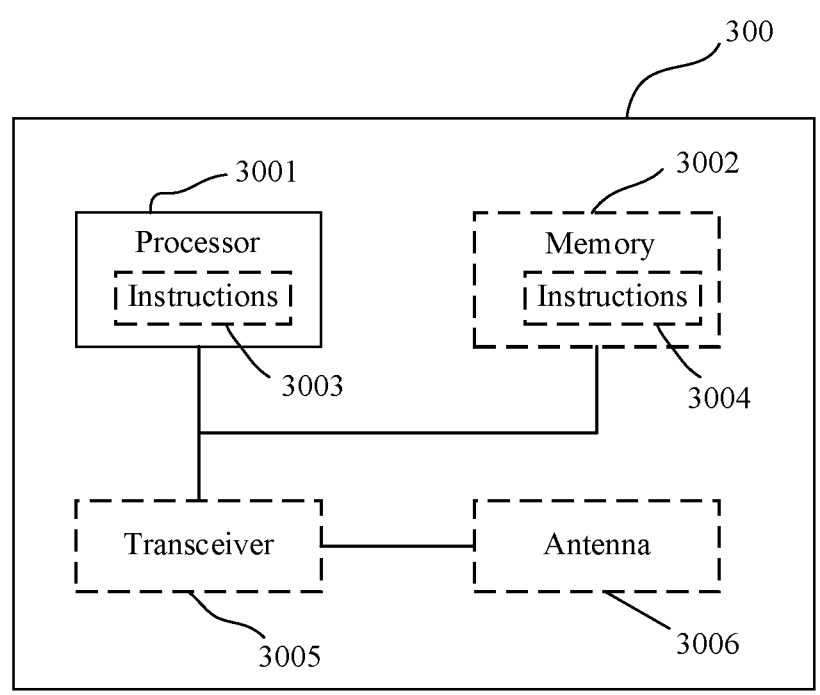
FIG. 18 is a schematic diagram of a structure of a communication apparatus according to an embodiment of this application.

FIG. 18 is a schematic diagram of a structure of an apparatus. The apparatus 300 may be a terminal device, or may be a chip, a chip system, a processor, or the like that supports the terminal device in implementing the foregoing method. The apparatus 300 may be configured to implement the method in the foregoing method embodiment. For details, refer to the descriptions in the foregoing method embodiment.

The apparatus 300 may include one or more processors 3001. The processor 3001 may also be referred to as a processing unit, and may implement a control function. The processor 3001 may be a general-purpose processor, a dedicated processor, or the like. For example, the processor 3001 may be a baseband processor or a central processing unit. The baseband processor may be configured to process a communication protocol and communication data. The central processing unit may be configured to control the communication apparatus (for example, a base station, a baseband chip, a terminal, a terminal chip, a DU, or a CU), execute a software program, and process data of the software program.

In an optional design, the processor 3001 may alternatively store instructions 3003, and the instructions 3003 may be run by the processor, to enable the apparatus 300 to perform the method in the foregoing method embodiment.

In another optional design, the processor 3001 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data, or the transceiver circuit, the interface, or the interface circuit may be configured to transmit or transfer a signal.

In still another possible design, the apparatus 300 may include a circuit, and the circuit may implement the sending, receiving, or communication function in the foregoing method embodiment.

Optionally, the apparatus 300 may include one or more memories 3002. The memory 3002 may store instructions 3004. The instructions may be run on the processor, to enable the apparatus 300 to perform the method in the foregoing method embodiment. Optionally, the memory may further store data. Optionally, the processor may also store instructions and/or data. The processor and the memory may be separately disposed, or may be integrated together. For example, the correspondence in the foregoing method embodiment may be stored in the memory or the processor.

Optionally, the apparatus 300 may further include a transceiver 3005 and/or an antenna 3006. The processor 3001 may be referred to as the processing unit, and control the apparatus 300. The transceiver 3005 may be referred to as a transceiver unit, a transceiver circuit, a transceiver apparatus, a transceiver module, or the like, and is configured to implement a transceiver function.

Optionally, the apparatus 300 in this embodiment of this application may be configured to perform the method in FIG. 5, FIG. 8, FIG. 10, FIG. 12, or FIG. 14 in embodiments of this application.

The processor and the transceiver in this application may be implemented on an integrated circuit (IC), an analog IC, a radio frequency integrated circuit RFIC, a mixed-signal IC, an application specific integrated circuit (ASIC), a printed circuit board (PCB), an electronic device, or the like. The processor and the transceiver may alternatively be manufactured by using various IC process technologies, for example, a complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The apparatus in the foregoing embodiment may be the terminal device. However, a range of the apparatus in this application is not limited thereto, and a structure of the apparatus may not be limited to FIG. 18. The apparatus may be an independent device, or may be a part of a large device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC such as a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a household device, a medical device, an industrial device, and the like; and (6) others.

Figure 19:
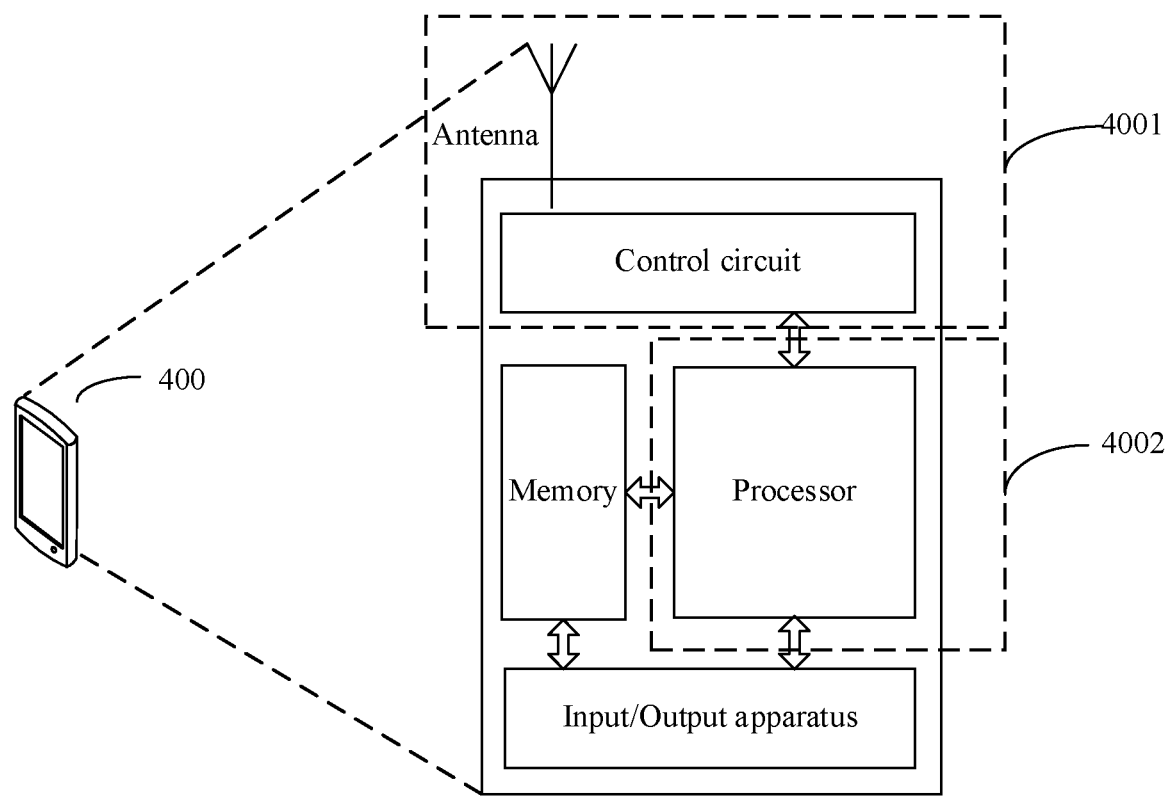
FIG. 19 is a schematic diagram of a structure of a terminal device according to an embodiment of this application.

FIG. 19 is a schematic diagram of a structure of a terminal device. The terminal device is applicable to the scenarios shown in FIG. 1 and FIG. 2. For ease of description, FIG. 19 shows only main components of the terminal device. As shown in FIG. 19, the terminal 400 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user and output data to the user.

After the terminal device is powered on, the processor may read a software program in a storage unit, parse and execute instructions of the software program, and process data of the software program. When data needs to be sent wirelessly, the processor performs baseband processing on the to-be-sent data, and then outputs a baseband signal to the radio frequency circuit. The radio frequency circuit processes the baseband signal to obtain a radio frequency signal, and then sends, through the antenna, the radio frequency signal in a form of an electromagnetic wave. When data is sent to the terminal, the radio frequency circuit receives a radio frequency signal through the antenna, the radio frequency signal is further converted into a baseband signal, and the baseband signal is output to the processor. The processor converts the baseband signal into data, and processes the data.

For ease of description, FIG. 19 shows only one memory and one processor. An actual terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 19 integrates functions of the baseband processor and the central processing unit. A person skilled in the art may understand that the baseband processor and the central processing unit may alternatively be independent processors, and interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of the software program. The processor executes the software program to implement a baseband processing function.

In an example, the antenna and the control circuit that have a transceiver function may be considered as a transceiver unit 4001 of the terminal 400, and the processor that has a processing function may be considered as a processing unit 4002 of the terminal 400. As shown in FIG. 19, the terminal 400 includes the transceiver unit 4001 and the processing unit 4002. The transceiver unit may also be referred to as a transceiver, a transceiver apparatus, or the like. Optionally, a component that is in the transceiver unit 4001 and that is configured to implement a receiving function may be considered as a receiving unit, and a component that is in the transceiver unit 4001 and that is configured to implement a sending function may be considered as a sending unit. That is, the transceiver unit 4001 includes the receiving unit and the sending unit. For example, the receiving unit may also be referred to as a receiver, a receiver circuit, or the like, and the sending unit may also be referred to as a transmitter, a transmitter circuit, or the like. Optionally, the receiving unit and the sending unit may be one integrated unit, or may be a plurality of independent units. The receiving unit and the sending unit may be in one geographical position, or may be distributed in a plurality of geographical positions.

Figure 20:
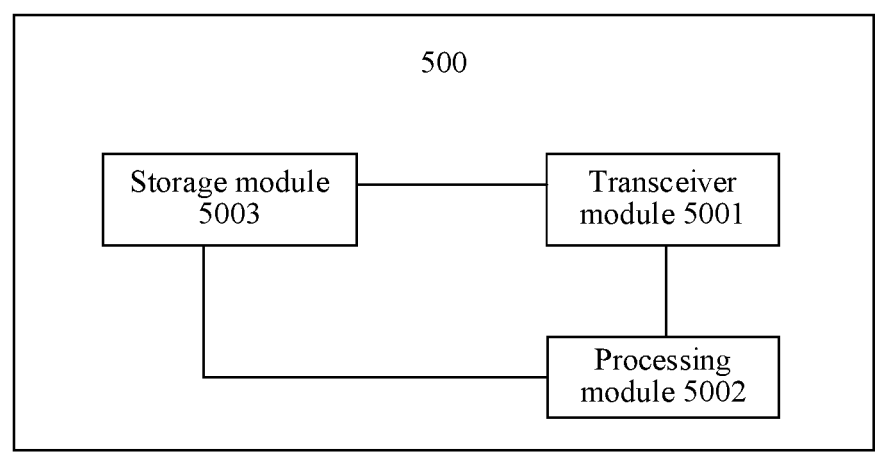
FIG. 20 is a schematic diagram of a structure of another communication apparatus according to an embodiment of this application.

As shown in FIG. 20, another embodiment of this application provides an apparatus 500. The apparatus may be a terminal device, or may be a component (for example, an integrated circuit or a chip) of the terminal device. Alternatively, the apparatus may be another communication module configured to implement the method in the method embodiment of this application. The apparatus 500 may include a processing module 5002 (which is also referred to as a processing unit). Optionally, the apparatus 500 may further include a transceiver module 5001 (which is also referred to as a transceiver unit) and a storage module 5003 (which is also referred to as a storage unit).

In a possible design, one or more modules in FIG. 20 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be separately disposed, or may be integrated.

The apparatus has a function of implementing the terminal device in embodiments of this application. For example, the apparatus includes a corresponding module, unit, or means used by the terminal device to perform the steps related to the first terminal or the second terminal and described in embodiments of this application. The function, the unit, or the means may be implemented by software or hardware, may be implemented by hardware executing corresponding software, or may be implemented by a combination of software and hardware.

Optionally, the modules in the apparatus 500 in this embodiment of this application may be configured to perform the method in FIG. 5, FIG. 8, FIG. 10, FIG. 12, or FIG. 14 in embodiments of this application.

In a possible implementation, the apparatus 500 may include the processing module 5002 and the transceiver module 5001.

In a possible design, the processing module 5002 is configured to obtain at least one first time window in a time-frequency resource set, where the time-frequency resource set is used by a terminal to send sidelink communication information. The transceiver module 5001 is configured to obtain first control information from a second terminal, where the first control information includes activation indication information. The processing module 5002 is further configured to activate one of the at least one first time window based on the first control information. The processing module 5002 is further configured to stop determining, by sensing the time-frequency resource set, a time-frequency resource for sending the sidelink communication information in the active first time window. The transceiver module 5001 is further configured to receive first indication information from the second terminal in the active first time window, where the first indication information indicates at least one time-frequency resource. The transceiver module 5001 is further configured to send first sidelink communication information on the at least one time-frequency resource.

In a possible design, the first control information includes deactivation indication information. The processing module 5002 is further configured to deactivate one of the at least one first time window based on the first control information. The processing module 5002 is further configured to determine, by sensing the time-frequency resource set, a time-frequency resource for sending the sidelink communication information in the deactivated first time window.

In a possible design, the transceiver module 5001 is further configured to receive second control information from the second terminal, where the second control information indicates to prolong duration of the first time window.

In a possible design, the first control information is carried on a physical channel.

In a possible design, the active first time window includes a first sub-time window and a second sub-time window; the first terminal stops sensing the time-frequency resource set in the first sub-time window; and the first terminal senses the time-frequency resource set in the second sub-time window.

In a possible implementation, the communication apparatus includes the processing module 5002 and the transceiver module 5001.

The processing module 5002 is configured to obtain at least one first time window in a time-frequency resource set, where the time-frequency resource set is used by a terminal to send sidelink communication information. The transceiver module 5001 is configured to send first control information to a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information. The transceiver module 5001 is further configured to send first indication information to the first terminal in the active first time window, where the first indication information indicates at least one time-frequency resource, and is used by the first terminal to send first sidelink communication information on the at least one time-frequency resource.

In a possible design, the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

In a possible design, the transceiver module 5001 is further configured to send second control information to the first terminal, where the second control information indicates to prolong duration of the first time window.

In a possible design, the first control information is carried on a physical channel.

In a possible design, the active first time window includes a first sub-time window and a second sub-time window; the first terminal stops sensing the time-frequency resource set in the first sub-time window; and the first terminal senses the time-frequency resource set in the second sub-time window.

In a possible implementation, the communication apparatus includes the processing module 5002 and the transceiver module 5001.

The processing module 5002 is configured to obtain at least one first time window in a time-frequency resource set, where the time-frequency resource set is used by a terminal to send sidelink communication information. The transceiver module 5001 is configured to send first control information to a second terminal, where the first control information includes activation indication information, and the activation indication information indicates to activate one of the at least one first time window. The processing module 5002 is further configured to stop determining, by sensing the time-frequency resource set, a time-frequency resource for sending the sidelink communication information in the active first time window. The transceiver module 5001 is further configured to receive first indication information from the second terminal in the active first time window, where the first indication information indicates at least one time-frequency resource. The transceiver module 5001 is further configured to send first sidelink communication information on the at least one time-frequency resource.

In a possible design, the first control information includes deactivation indication information, the deactivation indication information indicates to deactivate one of the at least one first time window, and the processing module 5002 is further configured to determine, in the deactivated first time window by sensing the time-frequency resource set, a time-frequency resource for sending the sidelink communication information.

In a possible design, the transceiver module 5001 is further configured to send second control information to the second terminal, where the second control information indicates to prolong duration of the first time window.

In a possible design, the first control information is carried on a physical channel.

In a possible design, the active first time window includes a first sub-time window and a second sub-time window; the first terminal stops sensing the time-frequency resource set in the first sub-time window; and the first terminal senses the time-frequency resource set in the second sub-time window.

In a possible implementation, the communication apparatus includes the processing module 5002 and the transceiver module 5001.

The processing module 5002 is configured to obtain at least one first time window in a time-frequency resource set, where the time-frequency resource set is used by a terminal to send sidelink communication information. The transceiver module 5001 is configured to receive first control information from a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information. The transceiver module 5001 is further configured to send first indication information to the first terminal, where the first indication information indicates at least one time-frequency resource, and is used by the first terminal to send first sidelink communication information on the at least one time-frequency resource.

In a possible design, the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

In a possible design, the transceiver module 5001 is further configured to receive second control information from the first terminal, where the second control information indicates to prolong duration of the first time window.

In a possible design, the first control information is carried on a physical channel.

In a possible design, the active first time window includes a first sub-time window and a second sub-time window; the first terminal stops sensing the time-frequency resource set in the first sub-time window; and the first terminal senses the time-frequency resource set in the second sub-time window.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with another feature based on a requirement. Correspondingly, the apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding application, but it should not be considered as that the implementation goes beyond the protection scope of embodiments of this application.

It may be understood that, the processor in embodiments of this application may be an integrated circuit chip, and has a signal processing capability. In an implementation process, steps in the foregoing method embodiments may be implemented by using an integrated logic circuit of hardware in the processor, or by using instructions in a form of software. The foregoing processor may be a general-purpose processor, a digital signal processor (DSP), an application specific integrated circuit (ASIC), a field programmable gate array (FPGA) or another programmable logic device, a discrete gate or a transistor logic device, or a discrete hardware component.

The solutions in this application may be implemented in various manners. For example, these technologies may be implemented by using hardware, software, or a combination of the hardware and the software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method in this specification aims to include, but not limited to, these and any memory of another appropriate type.

This application further provides a computer-readable storage medium. The computer-readable storage medium stores a computer program. When the computer program is executed by a computer, the function in any one of the foregoing method embodiments is implemented.

This application further provides a computer program product. When the computer program product is executed by a computer, the function in any one of the foregoing method embodiments is implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (SSD)), or the like.

Embodiments of the present invention are summarized here. Other embodiments can also be understood from the entirety of the specification and the claims filed herein.

Example 1. A communication method, where the method includes: obtaining, by a first terminal, at least one first time window in a time-frequency resource set, where the time-frequency resource set is used by a terminal to send sidelink communication information; obtaining, by the first terminal, first control information from a second terminal, where the first control information includes activation indication information; activating, by the first terminal, one of the at least one first time window based on the first control information; stopping, by the first terminal, determining, by sensing the time-frequency resource set, a time-frequency resource for sending the sidelink communication information in the active first time window; receiving, by the first terminal, first indication information from the second terminal in the active first time window, where the first indication information indicates at least one time-frequency resource; and sending, by the first terminal, first sidelink communication information on the at least one time-frequency resource.

Example 2. The method according to example 1, where the first control information includes deactivation indication information, and the method further includes: deactivating, by the first terminal, one of the at least one first time window based on the first control information; and determining, by the first terminal by sensing the time-frequency resource set, a time-frequency resource for sending the sidelink communication information in the deactivated first time window.

Example 3. The method according to example 1 or 2, where the method further includes: receiving, by the first terminal, second control information from the second terminal, where the second control information indicates to prolong duration of the first time window.

Example 4. A communication method, where the method includes: obtaining, by a second terminal, at least one first time window in a time-frequency resource set, where the time-frequency resource set is used by a terminal to send sidelink communication information; sending, by the second terminal, first control information to a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information; and sending, by the second terminal, first indication information to the first terminal in the active first time window, where the first indication information indicates at least one time-frequency resource, and is used by the first terminal to send first sidelink communication information on the at least one time-frequency resource.

Example 5. The method according to example 4, where the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

Example 6. The method according to example 4 or 5, where the method further includes: sending, by the second terminal, second control information to the first terminal, where the second control information indicates to prolong duration of the first time window.

Example 7. A communication method, where the method includes: obtaining, by a first terminal, at least one first time window in a time-frequency resource set, where the time-frequency resource set is used by a terminal to send sidelink communication information; sending, by the first terminal, first control information to a second terminal, where the first control information includes activation indication information, and the activation indication information indicates to activate one of the at least one first time window; stopping, by the first terminal, determining, by sensing the time-frequency resource set, a time-frequency resource for sending the sidelink communication information in the active first time window; receiving, by the first terminal, first indication information from the second terminal in the active first time window, where the first indication information indicates at least one time-frequency resource; and sending, by the first terminal, first sidelink communication information on the at least one time-frequency resource.

Example 8. The method according to example 7, where the first control information includes deactivation indication information, the deactivation indication information indicates to deactivate one of the at least one first time window, and the method further includes: determining, by the first terminal in the deactivated first time window by sensing the time-frequency resource set, a time-frequency resource for sending the sidelink communication information.

Example 9. The method according to example 7 or 8, where the method further includes: sending, by the first terminal, second control information to the second terminal, where the second control information indicates to prolong duration of the first time window.

Example 10. A communication method, where the method includes: obtaining, by a second terminal, at least one first time window in a time-frequency resource set, where the time-frequency resource set is used by a terminal to send sidelink communication information; receiving, by the second terminal, first control information from a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information; and sending, by the second terminal, first indication information to the first terminal in the active first time window, where the first indication information indicates at least one time-frequency resource, and is used by the first terminal to send first sidelink communication information on the at least one time-frequency resource.

Example 11. The method according to example 10, where the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

Example 12. The method according to example 10 or 11, where the method further includes: receiving, by the second terminal, second control information from the first terminal, where the second control information indicates to prolong duration of the first time window.

Example 13. The method according to any one of examples 1 to 12, where the first control information is carried on a physical channel.

Example 14. The method according to any one of examples 1 to 13, where the active first time window includes a first sub-time window and a second sub-time window; the first terminal stops sensing the time-frequency resource set in the first sub-time window; and the first terminal senses the time-frequency resource set in the second sub-time window.

Example 15. A communication apparatus, where the communication apparatus includes a processing module and a transceiver module, where the processing module is configured to obtain at least one first time window in a time-frequency resource set, where the time-frequency resource set is used by a terminal to send sidelink communication information; the transceiver module is configured to obtain first control information from a second terminal, where the first control information includes activation indication information; the processing module is further configured to activate one of the at least one first time window based on the first control information; the processing module is further configured to stop determining, by sensing the time-frequency resource set, a time-frequency resource for sending the sidelink communication information in the active first time window; the transceiver module is further configured to receive first indication information from the second terminal in the active first time window, where the first indication information indicates at least one time-frequency resource; and the transceiver module is further configured to send first sidelink communication information on the at least one time-frequency resource.

Example 16. The communication apparatus according to example 15, where the first control information includes deactivation indication information; the processing module is further configured to deactivate one of the at least one first time window based on the first control information; and the processing module is further configured to determine, by sensing the time-frequency resource set, a time-frequency resource for sending the sidelink communication information in the deactivated first time window.

Example 17. The communication apparatus according to example 15 or 16, where the transceiver module is further configured to receive second control information from the second terminal, where the second control information indicates to prolong duration of the first time window.

Example 18. A communication apparatus, where the communication apparatus includes a processing module and a transceiver module, where the processing module is configured to obtain at least one first time window in a time-frequency resource set, where the time-frequency resource set is used by a terminal to send sidelink communication information; the transceiver module is configured to send first control information to a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information; and the transceiver module is further configured to send first indication information to the first terminal in the active first time window, where the first indication information indicates at least one time-frequency resource, and is used by the first terminal to send first sidelink communication information on the at least one time-frequency resource.

Example 19. The communication apparatus according to example 18, where the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

Example 20. The communication apparatus according to example 18 or 19, where the transceiver module is further configured to send second control information to the first terminal, where the second control information indicates to prolong duration of the first time window.

Example 21. A communication apparatus, where the communication apparatus includes a processing module and a transceiver module, where the processing module is configured to obtain at least one first time window in a time-frequency resource set, where the time-frequency resource set is used by a terminal to send sidelink communication information; the transceiver module is configured to send first control information to a second terminal, where the first control information includes activation indication information, and the activation indication information indicates to activate one of the at least one first time window; the processing module is further configured to stop determining, by sensing the time-frequency resource set, a time-frequency resource for sending the sidelink communication information in the active first time window; the transceiver module is further configured to receive first indication information from the second terminal in the active first time window, where the first indication information indicates at least one time-frequency resource; and the transceiver module is further configured to send first sidelink communication information on the at least one time-frequency resource.

Example 22. The communication apparatus according to example 21, where the first control information includes deactivation indication information, and the deactivation indication information indicates to deactivate one of the at least one first time window; the processing module is further configured to determine, in the deactivated first time window by sensing the time-frequency resource set, a time-frequency resource for sending the sidelink communication information.

Example 23. The communication apparatus according to example 21 or 22, where the transceiver module is further configured to send second control information to the second terminal, where the second control information indicates to prolong duration of the first time window.

Example 24. A communication apparatus, where the communication apparatus includes a processing module and a transceiver module, where the processing module is configured to obtain at least one first time window in a time-frequency resource set, where the time-frequency resource set is used by a terminal to send sidelink communication information; the transceiver module is configured to receive first control information from a first terminal, where the first control information includes activation indication information, and the activation indication information indicates to activate one of the at least one first time window; and in the active first time window, the first terminal stops determining, by sensing the time-frequency resource set, a time-frequency resource for sending the sidelink communication information; and the transceiver module is further configured to send first indication information to the first terminal, where the first indication information indicates at least one time-frequency resource, and is used by the first terminal to send first sidelink communication information on the at least one time-frequency resource.

Example 25. The communication apparatus according to example 24, where the first control information includes deactivation indication information, and the deactivation indication information indicates to deactivate one of the at least one first time window; and in the deactivated first time window, the first terminal determines, by sensing the time-frequency resource set, a time-frequency resource for sending the sidelink communication information.

Example 26. The communication apparatus according to example 24 or 25, where the transceiver module is further configured to receive second control information from the first terminal, where the second control information indicates to prolong duration of the first time window.

Example 27. The communication apparatus according to any one of examples 15 to 26, where the first control information is carried on a physical channel.

Example 28. The communication apparatus according to any one of examples 15 to 27, where the active first time window includes a first sub-time window and a second sub-time window; the first terminal stops sensing the time-frequency resource set in the first sub-time window; and the first terminal senses the time-frequency resource set in the second sub-time window.

Example 29. A computer program product, including at least one processor and a memory, where the memory is configured to store a computer program, so that the method according to any one of examples 1 to 14 is implemented when the computer program is executed by the at least one processor.

Example 30. A computer-readable storage medium, where the computer-readable storage medium stores a computer program, and the method according to any one of claims 1 to 14 is implemented when the computer program is executed by a processor.

It may be understood that "an embodiment" mentioned in the whole specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that, in various embodiments of this application, sequence numbers of the foregoing processes do not mean an execution sequence. An execution sequence of the processes should be determined based on functions and internal logic of the processes, and should not constitute any limitation on an implementation process of embodiments of this application.

It may be understood that, in this application, "when" and "if" both mean that the apparatus performs corresponding processing in an objective situation, are not intended to limit time, do not require the apparatus to necessarily have a determining action during implementation, and do not mean other limitation.

"Simultaneously" in this application may be understood as being at a same time point, may be understood as being within a time period, or may be understood as being within a same period.

A person skilled in the art may understand that first, second, and various numerals in this application are only for distinguishing for ease of description, and are not for limiting the scope of embodiments of this application. A specific value of a numeral (which may also be referred to as an index), a specific value of a quantity, and a position in this application are only used as examples, but are not unique representation forms, and are not for limiting the scope of embodiments of this application. First, second, and various numerals in this application are also only for distinguishing for ease of description, and are not for limiting the scope of embodiments of this application.

In this application, an element represented in a singular form is intended to represent "one or more", but does not represent "only one", unless otherwise specified. In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship between associated objects and represents that three relationships may exist. For example, A and/or B may represent the following three cases: Only A exists, both A and B exist, and only B exists. A may be singular or plural, and B may be singular or plural. The character "/" generally indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C all exist. A may be singular or plural, B may be singular or plural, and C may be singular or plural.

It may be understood that, in embodiments of this application, "B corresponding to A" should indicate that B is associated with A, and B may be determined based on A. However, it should be further understood that determining B based on A does not mean that B is determined based on only A, that is, B may also be determined based on A and/or other information.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, appropriate deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "prestore", "prenegotiate", "preconfigure", "solidify", or "preburn".

A person of ordinary skill in the art may understand that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the functions for all particular applications, but it should not be considered that the implementation goes beyond the scope of this application.

A person of ordinary skill in the art may understand that, for the purpose of convenient and brief description, for a detailed working process of the foregoing system, apparatus, and unit, refer to a corresponding process in the foregoing method embodiment. Details are not described herein again.

It may be understood that the system, the apparatus, and the method in this application may alternatively be implemented in another manner. For example, the foregoing apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions in embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method in embodiments of this application. The foregoing storage medium includes: any medium that can store program code, for example, a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing implementations of this application are not intended to limit the protection scope of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. A communication method, wherein the method comprises:
    obtaining, by a first terminal, at least one first time window in a time-frequency resource set, wherein the time-frequency resource set is used by a terminal to send sidelink communication information;
    obtaining, by the first terminal, first control information from a second terminal, wherein the first control information comprises activation indication information;
    activating, by the first terminal, one of the at least one first time window based on the first control information to establish an active first time window;

stopping, by the first terminal, determining by sensing the time-frequency resource set, a time-frequency resource for sending the sidelink communication information in the active first time window;

receiving, by the first terminal, first indication information from the second terminal in the active first time window, wherein the first indication information indicates at least one time-frequency resource; and sending, by the first terminal, first sidelink communication information on the at least one time-frequency resource.

2. The method according to claim 1, wherein the first control information comprises deactivation indication information, and the method further comprises:

deactivating, by the first terminal, the one of the at least one first time window based on the first control information to establish a deactivated first time window; and determining by sensing the time-frequency resource set, by the first terminal, the time-frequency resource for sending the sidelink communication information in the deactivated first time window.

3. The method according to claim 1, wherein the method further comprises:

receiving, by the first terminal, second control information from the second terminal, wherein the second control information comprises an indication to prolong a duration of the active first time window.

4. The method according to claim 1, further comprising:

obtaining, by the second terminal, the at least one first time window in the time-frequency resource set;

sending, by the second terminal, the first control information to the first terminal, wherein the activation indication information comprises an indication to activate the one of the at least one first time window; and sending, by the second terminal, the first indication information to the first terminal in the active first time window, wherein the first indication information is used by the first terminal to send the first sidelink communication information on the at least one time-frequency resource.

5. The method according to claim 4, wherein:

the first control information comprises deactivation indication information;

the deactivation indication information comprises an indication to deactivate the one of the at least one first time window to establish a deactivated first time window; and in the deactivated first time window, the first terminal determines, by sensing the time-frequency resource set, a time-frequency resource for sending the sidelink communication information.

6. The method according to claim 4, wherein the method further comprises:

sending, by the second terminal, second control information to the first terminal, wherein the second control information comprises an indication to prolong a duration of the active first time window.

7. The method according to claim 1, wherein the first control information is carried on a physical channel.

8. The method according to claim 1, wherein the active first time window comprises a first sub-time window and a second sub-time window.

9. A non-transitory computer readable medium with instructions stored thereon, wherein at least one processor, when executing the instructions, is enabled to perform the method of claim 1.

10. A communication method, wherein the method comprises:

obtaining, by a first terminal, at least one first time window in a time-frequency resource set, wherein the time-frequency resource set is used by a terminal to send sidelink communication information;

sending, by the first terminal, first control information to a second terminal, wherein the first control information comprises activation indication information, and the activation indication information comprises an indication to activate one of the at least one first time window to establish an active first time window;

stopping, by the first terminal, determining by sensing the time-frequency resource set, a time-frequency resource for sending the sidelink communication information in the active first time window;

receiving, by the first terminal, first indication information from the second terminal in the active first time window, wherein the first indication information indicates at least one time-frequency resource; and sending, by the first terminal, first sidelink communication information on the at least one time-frequency resource.

11. The method according to claim 10, wherein:

the first control information comprises deactivation indication information;

the deactivation indication information comprises an indication to deactivate one of the at least one first time window to establish a deactivated first time window; and the method further comprises determining, by sensing the time-frequency resource set, by the first terminal in the deactivated first time window, the time-frequency resource for sending the sidelink communication information.

12. The method according to claim 10, wherein the method further comprises:

sending, by the first terminal, second control information to the second terminal, wherein the second control information comprises an indication to prolong a duration of the active first time window.

13. The method according to claim 10, further comprising:

obtaining, by the second terminal, the at least one first time window in the time-frequency resource set;

receiving, by the second terminal, the first control information from the first terminal; and sending, by the second terminal, the first indication information to the first terminal in the active first time window, wherein the first indication information is used by the first terminal to send the first sidelink communication information on the at least one time-frequency resource.

14. The method according to claim 10, wherein the first control information is carried on a physical channel.

15. The method according to claim 10, wherein:

the active first time window comprises a first sub-time window and a second sub-time window;

the first terminal stops sensing the time-frequency resource set in the first sub-time window; and the first terminal senses the time-frequency resource set in the second sub-time window.

16. A communication apparatus, comprising:

a processor; and a transceiver coupled to the processor, wherein:

the processor is configured to obtain at least one first time window in a time-frequency resource set, wherein the time-frequency resource set is used by a terminal to send sidelink communication information;

the transceiver is configured to obtain first control information from a second terminal, wherein the first control information comprises activation indication information;

the processor is further configured to:

activate one of the at least one first time window based on the first control information to establish an active first time window, and stop determining by sensing the time-frequency resource set, a time-frequency resource for sending the sidelink communication information in the active first time window; and the transceiver is further configured to:

receive first indication information from the second terminal in the active first time window, wherein the first indication information indicates at least one time-frequency resource, and send first sidelink communication information on the at least one time-frequency resource.

17. The communication apparatus according to claim 16, wherein:

the first control information comprises deactivation indication information; and the processor is further configured to:

deactivate one of the at least one first time window based on the first control information to establish a deactivated first time window, and determine by sensing the time-frequency resource set, the time-frequency resource for sending the sidelink communication information in the deactivated first time window.

18. The communication apparatus according to claim 16, wherein the transceiver is further configured to receive second control information from the second terminal, and the second control information comprises an indication to prolong a duration of the active first time window.

19. The communication apparatus according to claim 16, wherein the first control information is carried on a physical channel.

20. The communication apparatus according to claim 16, wherein:

the active first time window comprises a first sub-time window and a second sub-time window;

the processor is further configured to stop sensing the time-frequency resource set in the first sub-time window; and the processor is further configured to sense the time-frequency resource set in the second sub-time window.

\* \* \* \* \*